United States Patent
Gao et al.

(10) Patent No.: US 12,507,241 B2
(45) Date of Patent: Dec. 23, 2025

(54) DYNAMIC INDICATION OF MULTI-TRP PDSCH TRANSMISSION SCHEMES

(71) Applicant: Telefonaktiebolaget LM Ericsson (publ), Stockholm (SE)

(72) Inventors: Shiwei Gao, Nepean (CA); Siva Muruganathan, Stittsville (CA); Sebastian Faxér, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 405 days.

(21) Appl. No.: 17/608,558

(22) PCT Filed: May 1, 2020

(86) PCT No.: PCT/IB2020/054168
§ 371 (c)(1),
(2) Date: Nov. 3, 2021

(87) PCT Pub. No.: WO2020/225692
PCT Pub. Date: Nov. 12, 2020

(65) Prior Publication Data
US 2022/0232614 A1    Jul. 21, 2022

Related U.S. Application Data

(60) Provisional application No. 62/843,249, filed on May 3, 2019.

(51) Int. Cl.
*H04L 5/00* (2006.01)
*H04W 72/23* (2023.01)

(52) U.S. Cl.
CPC ........... *H04W 72/23* (2023.01); *H04L 5/0048* (2013.01)

(58) Field of Classification Search
CPC ............. H04W 72/23; H04W 72/0446; H04W 72/0453; H04W 72/046; H04L 5/0023;
(Continued)

(56) References Cited

U.S. PATENT DOCUMENTS 11,224,065 B2    1/2022   Jiang et al.
2014/0119266 A1  5/2014   Ng et al.
(Continued)

FOREIGN PATENT DOCUMENTS

CN    108293242 A    7/2018
EP    2648448 A1    10/2013
(Continued)

OTHER PUBLICATIONS

Panasonic (On multi-TRP enhancements for NR MIMO in Rel. 16, R1-1904190, Apr. 2019).*
(Continued)

*Primary Examiner* — Lakeram Jangbahadur
(74) *Attorney, Agent, or Firm* — Withrow & Terranova, PLLC

(57) ABSTRACT

Dynamic indication of multi-Transmission/Reception Point (TRP) Physical Downlink Shared Channel (PDSCH) transmission is provided. A solution is proposed to use an antenna port field (e.g., a Demodulation Reference Signal (DM-RS) port indication field) in Downlink Control Information (DCI) to jointly indicate both the DM-RS ports and the scheme used for a PDSCH transmission. When more than one Transmission Configuration Indicator (TCI) state is indicated in a DCI, a new DM-RS table is used in which a DM-RS port allocation is also linked to a transmission scheme. The solution enables flexible PDSCH scheduling without introducing additional DCI overhead.

16 Claims, 16 Drawing Sheets

(58) Field of Classification Search
CPC ... H04L 5/0051; H04L 5/0091; H04L 5/0035; H04L 5/0053

See application file for complete search history.

(56) References Cited

U.S. PATENT DOCUMENTS

| | | | |
|---|---|---|---|
| 2015/0098369 | A1 | 4/2015 | Song et al. |
| 2018/0103433 | A1 | 4/2018 | Li et al. |
| 2018/0183556 | A1 | 6/2018 | Shin et al. |
| 2020/0221428 | A1* | 7/2020 | Moon .................. H04L 1/0046 |
| 2021/0282182 | A1* | 9/2021 | Nogami ............... H04W 74/08 |
| 2022/0007406 | A1 | 1/2022 | Matsumura et al. |
| 2022/0014299 | A1 | 1/2022 | Ji et al. |
| 2022/0015085 | A1 | 1/2022 | Zhang et al. |
| 2022/0104237 | A1 | 3/2022 | Muruganathan et al. |

FOREIGN PATENT DOCUMENTS

| | | | | |
|---|---|---|---|---|
| EP | 2717502 | A1 | 4/2014 | |
| EP | 2765723 | B1 | 5/2016 | |
| EP | 2866371 | B1 | 11/2017 | |
| EP | 2501071 | B1 | 1/2018 | |
| EP | 3651397 | A1 * | 5/2020 | ............. H04B 7/024 |
| ID | 201702510 | A | 3/2017 | |
| KR | 20180127154 | A | 11/2018 | |
| KR | 20180137415 | A | 12/2018 | |
| KR | 20190010507 | A | 1/2019 | |
| KR | 20190017675 | A | 2/2019 | |
| KR | 20190017731 | A | 2/2019 | |
| WO | 2015142664 | A1 | 9/2015 | |
| WO | 2016208991 | A1 | 12/2016 | |
| WO | 2017222277 | A1 | 12/2017 | |
| WO | 2018143784 | A1 | 8/2018 | |
| WO | 2019050913 | A1 | 3/2019 | |
| WO | 2019066618 | A1 | 4/2019 | |
| WO | 2020096795 | A1 | 5/2020 | |
| WO | 2020201995 | A1 | 10/2020 | |

OTHER PUBLICATIONS

Qualcomm (Multi-TRP Enhancements, R1-1905026, Apr. 2019).*
ZTE (Enhancements on multi-TRP/Panel transmission, Nov. 2018).*
Notification of Reason for Refusal for Korean Patent Application No. 10-2021-7034327, mailed Mar. 7, 2022, 6 pages.
Notice of Allowance for U.S. Appl. No. 17/600,000, mailed Jan. 31, 2022, 7 pages.
Examination Report for Indian Patent Application No. 202147048763, mailed May 6, 2022, 8 pages.
Office Action for Russian Patent Application No. 2021131265, mailed May 6, 2022, 11 pages.
First Office Action for Chinese Patent Application No. 202080040078.X, mailed Aug. 26, 2023, 9 pages.
Request for the Submission of an Opinion for Korean Patent Application No. 10-2021-7034327, mailed Jun. 16, 2023, 1 pages.
Request for the Submission of an Opinion for Korean Patent Application No. 10-2023-7013762, mailed Jun. 16, 2023, 6 pages.
Examination Report for European Patent Application No. 20724590.3, mailed Jun. 6, 2023, 5 pages.
Author Unknown, "Technical Specification Group Radio Access Network; NR; Multiplexing and channel coding (Release 15)," Excerpt from Technical Specification 38.212, Version 15.5.0, Mar. 2019, 3GPP Organizational Partners, 10 pages.
Author Unknown, "Technical Specification Group Radio Access Network; NR; Physical layer procedures for data (Release 15)," Excerpt from Technical Specification 38.214, Version 15.5.0, Mar. 2019, 3GPP Organizational Partners, 5 pages.
QUALCOMM Incorporated, "R1-1905026: Multi-TRP Enhancements," 3GPP TSG-RAN WG1 Meeting #96b, Apr. 8-12, 2019, Xi'an, China, 30 pages.
Intention to Grant for European Patent Application No. 20718781.6, mailed Sep. 12, 2022, 5 pages.

Notice of Reasons for Refusal for Japanese Patent Application No. 2021-565125, mailed Oct. 28, 2022, 8 pages.
Office Action for Egyptian Patent Application No. PCT1521/2021, 3 pages (translation only).
Non-Final Office Action for U.S. Appl. No. 17/867,168, mailed Oct. 16, 2023, 4 pages.
Author Unknown, "Technical Specification Group Radio Access Network; NR; Physical channels and modulation (Release 15)," Technical Specification 38.211, Version 15.4.0, Dec. 2018, 96 pages.
Author Unknown, "Technical Specification Group Radio Access Network; NR; Multiplexing and channel coding (Release 15)," Technical Specification 38.212, Version 15.4.0, Dec. 2018, 100 pages.
Author Unknown, "Technical Specification Group Radio Access Network; NR; Physical layer procedures for control (Release 15)," Technical Specification 38.213, Version 15.4.0, Dec. 2018, 104 pages.
Author Unknown, "Technical Specification Group Radio Access Network; NR; Physical layer procedures for data (Release 15)," Technical Specification 38.214, Version 15.4.0, Dec. 2018, 102 pages.
Ericsson, "R1-1902540: On multi-TRP and multi-panel," Third Generation Partnership Project (3GPP), TSG RAN WG1 Meeting #96, Feb. 25-Mar. 1, 2019, 11 pages, Athens, Greece.
Ericsson, "R1-1902859: Multi-TRP diversity strategies at 4 GHZ," Third Generation Partnership Project (3GPP), TSG RAN WG1 Meeting #96, Feb. 25-Mar. 1, 2019, 5 pages, Athens, Greece.
Ericsson, "R1-1904750: On multi-TRP and multi-panel," Third Generation Partnership Project (3GPP), TSG RAN WG1 Meeting RAN1#96-bis, Apr. 8-12, 2019, 18 pages, Xi'an, China.
Ericsson, "R1-1905163: Additional system-level results on NC-JT with different codeword to layer mappings," Third Generation Partnership Project (3GPP), TSG RAN WG1 Meeting RAN1#96-bis, Apr. 8-12, 2019, 2 pages, Xi'an, China.
Ericsson, "R1-1905164: Link-level results on the codeword-to-layer mapping for single-PDCCH NC-JT," Third Generation Partnership Project (3GPP), TSG-RAN WG1 Meeting #96bis, Apr. 8-12, 2019, 3 pages, Xi'an, China.
Ericsson, "R1-1905165: Performance comparison of different RV combinations for SDM and FDM based multi-TRP schemes," Third Generation Partnership Project (3GPP), TSG RAN WG1 Meeting #96bis, Apr. 8-12, 2019, 3 pages, Xian, China.
Ericsson, "R1-1905166: NC-JT performance with layer restriction between TRPs," Third Generation Partnership Project (3GPP), TSG RAN WG1 Meeting #96bis, Apr. 8-12, 2019, 5 pages, Xian, China.
Ericsson, "R1-1905167: On the number of TRPs for high reliability at 4 GHz," Third Generation Partnership Project (3GPP), TSG RAN WG1 Meeting #96bis, Apr. 8-12, 2019, 6 pages, Xi'an, China.
Ericsson, "R1-1905168: Performance evaluation of NC-JT with different clustering approaches," Third Generation Partnership Project (3GPP), TSG RAN WG1 Meeting #96bis, Apr. 8-12, 2019, 6 pages, Xi'an, China.
Ericsson, "R1-1905169: On MAC-CE signaling impact for Rel-16 TCI indication framework," Third Generation Partnership Project (3GPP), TSG RAN WG1 Meeting #96bis, Apr. 8-12, 2019, 3 pages, Xi'an, China.
Ericsson, "R1-1905179: Additional evaluation results on different multi-TRP schemes for reliable PDSCH transmission in URLLC," Third Generation Partnership Project (3GPP), TSG RAN WG1 Meeting #96bis, Apr. 8-12, 2019, 8 pages, Xi'an, China.
Huawei, et al., "R1-1903541: Summary of AI: 7.2.8.2 Enhancements on Multi-TRP/Panel Transmission of Offline Discussion," Third Generation Partnership Project (3GPP), TSG RAN WG1 Meeting #96, Feb. 25-Mar. 1, 2019, 59 pages, Athens, Greece.
Huawei, "R1-1903610: Offline Discussion for Multi-TRP/Panel Transmission and General plan for RAN1 96bis," Third Generation Partnership Project (3GPP), TSG RAN WG1 Meeting #96, Feb. 25-Mar. 1, 2019, 4 pages, Athens, Greece.
Intel, "R1-1901275: On multi-TRP/multi-panel transmission," Third Generation Partnership Project (3GPP), TSG RAN WG1 Ad-Hoc Meeting 1901, Jan. 21-25, 2019, 12 pages, Taipei, Taiwan.

(56) References Cited

OTHER PUBLICATIONS

Nokia, "R1-1900691: Enhancements on Multi-TRP/Panel Transmission," Third Generation Partnership Project (3GPP), TSG RAN WG1 Ad-Hoc Meeting 1901, Jan. 21-25, 2019, 9 pages, Taipei, Taiwan.

NTT DOCOMO, et al., "R1-1813333: Enhancements on multi-TRP/panel transmission," Third Generation Partnership Project (3GPP), TSG RAN WG1 Meeting #95, Nov. 12-16, 2018, 20 pages, Spokane, USA.

Panasonic, "R1-1904190: On multi-TRP enhancements for NR MIMO in Rel. 16," Third Generation Partnership Project '3GPP), TSG RAN WG1 #96bis, Apr. 8-12, 2019, 13 pages, Xi'an, China.

Qualcomm Incorporated, "R1-1900905: Multi-TRP Enhancements," Third Generation Partnership Project (3GPP), TSG-RAN WG1 Meeting AH-1901, Jan. 21-25, 2019, 26 pages, Taipei, Taiwan.

Qualcomm Incorporated: "R1-1903043: Multi-TRP Enhancements," Third Generation Partnership Project (3GPP), TSG-RAN WG1 Meeting #96, Feb. 25-Mar. 1, 2019, 30 pages, Athens, Greece.

Vivo, "R1-1901702: Further Discussion on Multi-TRP Transmission," Third Generation Partnership Project (3GPP), TSG RAN1 #96, Feb. 25-Mar. 1, 2019, 14 pages, Athens, Greece.

ZTE, "R1-1812256: Enhancements on multi-TRP/Panel transmission," Third Generation Partnership Project (3GPP), TSG RAN WG1 Meeting #95, Nov. 12-16, 2018, 14 pages, Spokane, USA.

International Search Report and Written Opinion for International Patent Application No. PCT/IB2020/053027, mailed Jun. 19, 2020, 17 pages.

Written Opinion for International Patent Application No. PCT/IB2020/053027, mailed Mar. 2, 2021, 4 pages.

International Preliminary Report on Patentability for International Patent Application No. PCT/IB2020/053027, mailed May 28, 2021, 23 pages.

Invitation to Pay Additional Fees and Partial Search for International Patent Application No. PCT/IB2020/054168, mailed Jul. 17, 2020, 15 pages.

International Search Report and Written Opinion for International Patent Application No. PCT/IB2020/054168, mailed Sep. 8, 2020, 20 pages.

Technical Examination Report for Brazilian Patent Application No. 112021019292-1, mailed Mar. 25, 2024, 10 pages.

Final Office Action for U.S. Appl. No. 17/867,168, mailed Apr. 4, 2024, 9 pages.

Written Decision on Registration for Korean Patent Application No. 10-2024-7017552, mailed Aug. 29, 2024, 6 pages.

Ericsson, "R1-1811864: Summary of 7.1.3.1 (DCI contents and formats)," 3GPP TSG-RAN WG1 #94bis, Oct. 8-12, 2018, Chengdu, China, 13 pages.

ZTE, "R1-1808202: Enhancements on multi-TRP transmission and reception," 3GPP TSG RAN WG1 Meeting #94, Aug. 20-24, 2018, Gothenburg, Sweden, 5 pages.

First Office Action for Chinese Patent Application No. 202080042987, mailed Dec. 16, 2024, 34 pages.

Notice of Reasons for Refusal for Japanese Patent Application No. 2024-001434, mailed Dec. 2, 2024, 6 pages.

Examination Report for European Patent Application No. 20724590.3, mailed Jul. 14, 2025, 4 pages.

\* cited by examiner

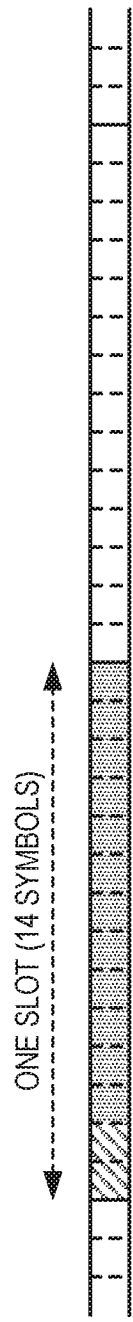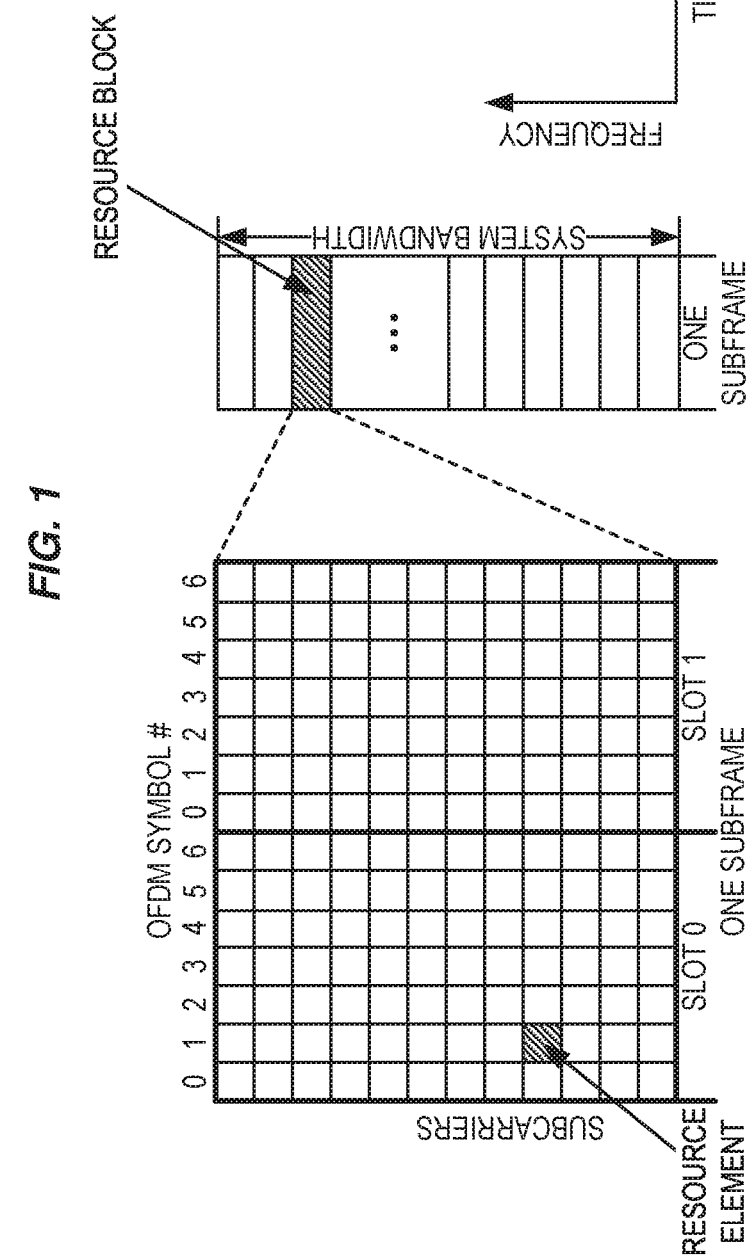

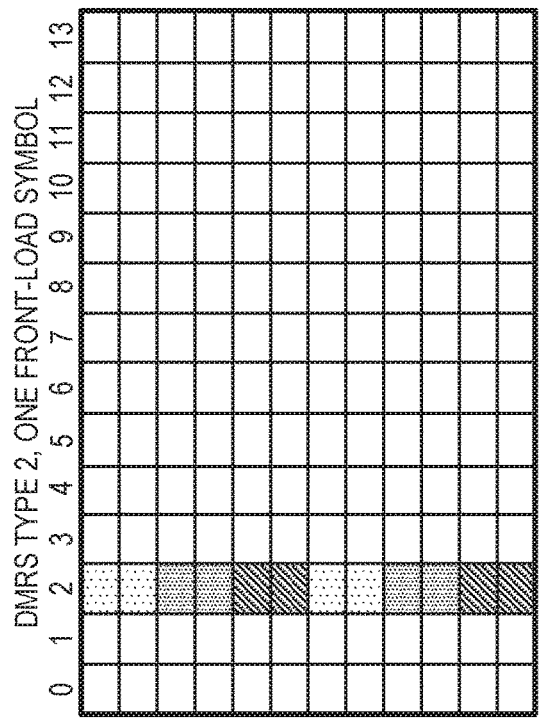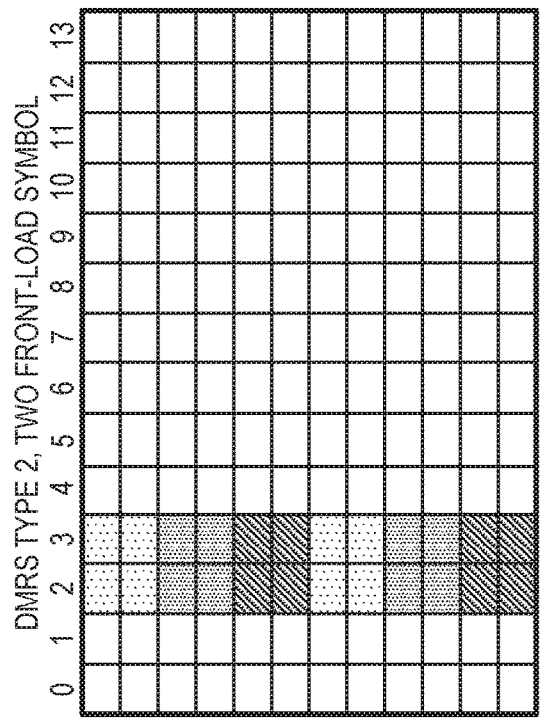
FIG. 8B
FIG. 8D
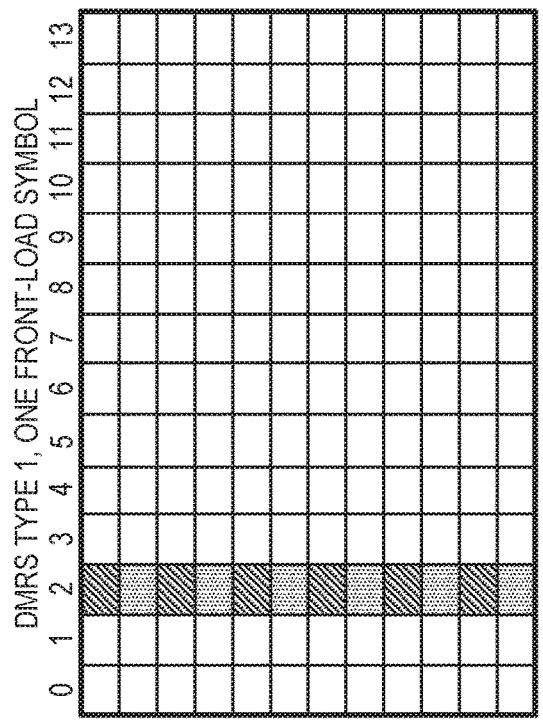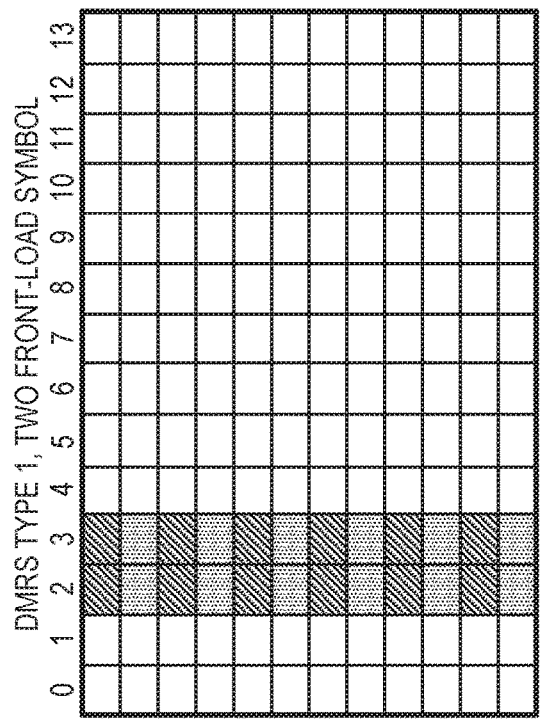
FIG. 8A
FIG. 8C

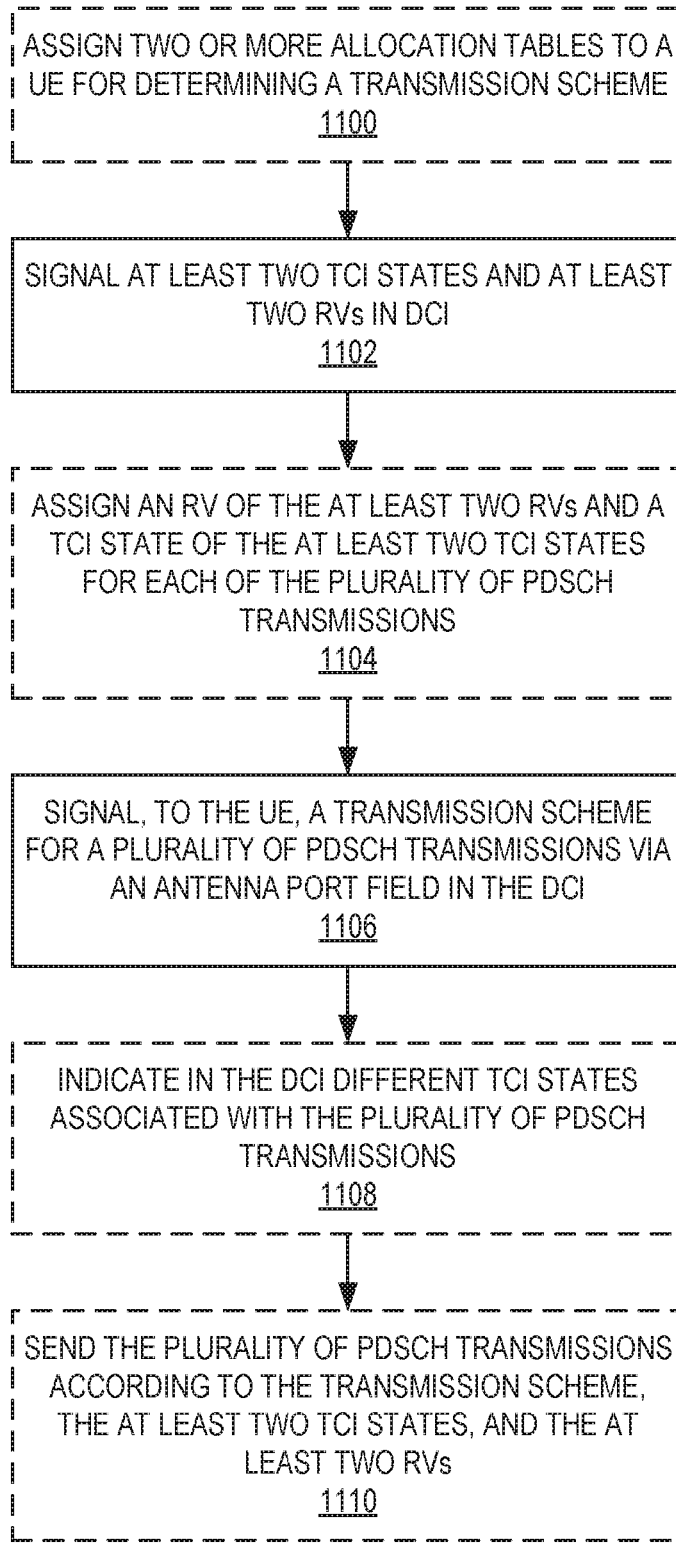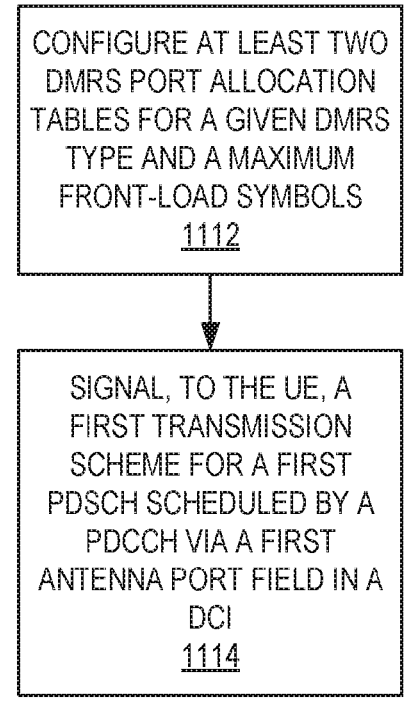
FIG. 11A
FIG. 11B

DYNAMIC INDICATION OF MULTI-TRP PDSCH TRANSMISSION SCHEMES

RELATED APPLICATIONS

This application is a 35 U.S.C. § 371 national phase filing of International Application No. PCT/IB2020/054168, filed May 1, 2020, which claims the benefit of provisional patent application Ser. No. 62/843,249, filed May 3, 2019, the disclosures of which are hereby incorporated herein by reference in their entireties.

TECHNICAL FIELD

The present disclosure relates to indication of downlink transmission schemes in wireless communications networks.

BACKGROUND

The Fifth Generation (5G) mobile wireless communications system or New Radio (NR) supports a diverse set of use cases and a diverse set of deployment scenarios. NR uses Cyclic Prefix Orthogonal Frequency Division Multiplexing (CP-OFDM) in the Downlink (DL) (i.e. from a network node, New Radio Base Station (gNB), Enhanced or Evolved Node B (eNB), or other base station, to a User Equipment (UE)) and both CP-OFDM and Discrete Fourier Transform Spread Orthogonal Frequency Division Multiplexing (DFT-S-OFDM) in the Uplink (UL) (i.e. from UE to gNB). In the time domain, NR DL and UL physical resources are organized into equally-sized subframes of 1 millisecond (ms) each. A subframe is further divided into multiple slots of equal duration.

The slot length depends on subcarrier spacing. For subcarrier spacing of $\Delta f=15$ kilohertz (kHz), there is only one slot per subframe and each slot always consists of 14 Orthogonal Frequency Division Multiplexing (OFDM) symbols, irrespectively of the subcarrier spacing.

FIG. 1 is a schematic diagram of an example NR time-domain data scheduling structure with 15 kHz subcarrier spacing. As illustrated, typical data scheduling in NR are per slot basis, where the first two symbols contain Physical DL Control Channel (PDCCH) and the remaining 12 symbols contains Physical Data Channel (PDCH), either a Physical DL Shared Channel (PDSCH) or Physical UL Shared Channel (PUSCH).

Different subcarrier spacing values are supported in NR. The supported Subcarrier Spacing (SCS) values (also referred to as different numerologies) are given by $\Delta f=(15 \times 2^{\alpha})$ kHz where $\alpha \in (0,1,2,4,8)$. $\Delta f=15$ kHz is the basic subcarrier spacing that is also used in Long Term Evolution (LTE), the corresponding slot duration is 1 ms. For a given SCS, the corresponding slot duration is $1/2^{\alpha}$ ms.

FIG. 2 is a schematic diagram of a basic NR physical time-frequency resource grid. In the frequency domain physical resource definition, a system bandwidth is divided into Resource Blocks (RBs), each corresponds to 12 contiguous subcarriers. In the resource grid illustrated in FIG. 2, only one RB within a 14-symbol slot is shown. One OFDM subcarrier during one OFDM symbol interval forms one Resource Element (RE).

DL transmissions can be dynamically scheduled, i.e., in each slot the gNB transmits DL Control Information (DCI) over PDCCH about which UE data is to be transmitted to and which RBs and OFDM symbols in the current DL slot the data is transmitted on. PDCCH is typically transmitted in the first one or two OFDM symbols in each slot in NR. The UE data are carried on PDSCH. A UE first detects and decodes PDCCH and if the decoding is successful, it then decodes the corresponding PDSCH based on the decoded control information in the PDCCH.

UL data transmission can also be dynamically scheduled using PDCCH. Similar to DL, a UE first decodes UL grants in PDCCH and then transmits data over PUSCH based on the decoded control information in the UL grant such as modulation order, coding rate, UL resource allocation, etc.

Reliable Data Transmission with Multiple Transmission Points

FIG. 3 is a schematic diagram of an example data transmission over multiple Transmission/Reception Points (TRPs) for increasing reliability. Reliable data transmission with multiple panels or TRPs has been proposed in Third Generation Partnership Project (3GPP) for Rel-16, in which a data packet may be transmitted over multiple TRPs to achieve diversity. As shown in FIG. 3, the two PDSCHs carry the same Transport Block (TB) but with the same or different Redundancy Versions (RVs) so that the UE can do soft combining of the two PDSCHs to achieve more reliable reception.

Different schemes have been identified for PDSCH transmissions from multiple TRPs, including:
  Single Frequency Network (SFN) with Cyclic Delay Diversity (CDD)
  Spatial Division Multiplexing (SDM)
  Frequency Domain Multiplexing (FDM)
  Time Domain Multiplexing (TDM)

FIGS. 4A-4D are schematic diagrams of the different PDSCH transmission schemes. FIG. 4A illustrates a single TRP, FIG. 4B illustrates SFN with CDD, FIG. 4C illustrates SDM/FDM with a single Codeword (CW) and a single RV, and FIG. 4D illustrates SDM/FDM/TDM with two CWs each with a different RV (i.e., RV1 and RV2), referred to as multi-RV.

For SDM and FDM schemes, there are different sub-schemes depending on whether a CW with a single RV is used or multiple CWs each with a different RV are used in the transmissions. For TDM scheme, there can be slot based or mini-slot based sub-schemes.

FIG. 5 is a schematic diagram of an example slot-based TDM scheme for PDSCH transmissions over multiple TRPs. In 3GPP RAN1 #96bis, it was agreed that both slot and mini-slot based TDM schemes will be supported in NR Rel-16, in which PDSCHs in consecutive slots or mini-slots may be transmitted from different TRPs. As shown in FIG. 5, 4 PDSCHs for a same TB are transmitted over 4 TRPs and in 4 consecutive slots. Each PDSCH is associated with a different RV. The RV and TRP associated with each slot can be either preconfigured or dynamically signaled.

FIG. 6 is a schematic diagram of an example data transmission over multiple TRPs under an SDM scheme. The example SDM scheme has a single RV in which a PDSCH with two spatial layers, one from each TRP, is transmitted to a UE.

FIG. 7A is a schematic diagram of an example data transmission over multiple TRPs under an FDM scheme. The example FDM scheme has a single RV in which a PDSCH is transmitted in RB #0,1, 4,5,8,9 from TRP1 and RB #2,3,6,7,10,11 from TRP2.

FIG. 7B is a schematic diagram of an example data transmission over multiple TRPs under an FDM multi-RV scheme. The example FDM multi-RV scheme has two PDSCH transmissions, PDSCH #1 and PDSCH #2, for a same TB from two TRPs to a UE. PDSCH #1 is transmitted in RB #0,1, 4,5 from TRP1 with RV #1 and PDSCH #2 is transmitted in RB #2,3,6,7 from TRP2 with RV #2.

FIG. 7C is a schematic diagram of an example data transmission over multiple TRPs under a mini-slot-based TDM scheme. The example TDM scheme has two PDSCH transmissions, PDSCH #1 and PDSCH #2, for a same TB from two TRPs to a UE. PDSCH #1 is transmitted in a first mini-slot from TRP1 with RV #1 and PDSCH #2 is transmitted in a second mini-slot from TRP2 with RV #2.

Quasi Co-Located (QCL) Antennas

Several signals can be transmitted from the same base station antenna from different antenna ports. These signals can have the same large-scale properties, for instance in terms of Doppler shift/spread, average delay spread, or average delay. These antenna ports are then said to be QCL.

The network can then signal to the UE that two antenna ports are QCL. If the UE knows that two antenna ports are QCL with respect to a certain parameter (e.g., Doppler spread), the UE can estimate that parameter based on one of the antenna ports and use that estimate when receiving the other antenna port. Typically, the first antenna port is represented by a measurement Reference Signal (RS) (known as a source RS) such as Channel State Information RS (CSI-RS) and the second antenna port is a Demodulation RS (DM-RS) (known as target RS). This is useful for demodulation since the UE can know beforehand the properties of the channel when doing channel estimation with DM-RS.

Information about what assumptions can be made regarding QCL is signaled to the UE from the network. In NR, four types of QCL relations between a transmitted source RS and transmitted target RS were defined:

Type A: {Doppler shift, Doppler spread, average delay, delay spread}
Type B: {Doppler shift, Doppler spread}
Type C: {average delay, Doppler shift}
Type D: {Spatial Receive (Rx) parameter}

QCL type D was introduced to facilitate beam management with analog beamforming and is known as spatial QCL. There is currently no strict definition of spatial QCL, but the understanding is that if two transmitted antenna ports are spatially QCL, the UE can use the same Rx beam to receive them.

Transmission Configuration Indicator (TCI) States

For dynamic indication of PDSCH transmission over different TRPs or beams, a UE can be configured through Radio Resource Control (RRC) signaling with a list of N TCI states, where N is up to 128 in Frequency Range 2 (FR2) and up to 8 in Frequency Range 1 (FR1), depending on UE capability.

Each TCI state contains QCL information, i.e. one or two source DL RSs, each source RS associated with a QCL type. The list of TCI states can be interpreted as a list of N possible TRPs or beams that may be used by the network to transmit PDSCH to the UE.

The network can activate up to eight active TCI states. For a given PDSCH transmission, the associated active TCI state(s) is dynamically signaled in the TCI field of DCI in the corresponding PDCCH scheduling the PDSCH. In NR Rel-15, only one TCI state can be indicated. It has been agreed that up to two TCI states can be indicated in DCI in NR Rel-16. The TCI state(s) indicates which TRP(s) the PDSCH is transmitted from.

Demodulation Reference Signals (DM-RS)

Demodulation reference signals are used for coherent demodulation of physical layer data channels, PDSCH (DL) or PUSCH (UL). The DM-RS is confined to RBs carrying the associated physical layer channel and is mapped on allocated REs of the OFDM time-frequency grid such that the receiver can efficiently handle time/frequency-selective fading radio channels.

The mapping of DM-RS to REs is configurable in both frequency and time domain, with two mapping types in the frequency domain (configuration type 1 or type 2). The DM-RS mapping in time domain can be either single-symbol based or double-symbol based where the latter means that DM-RS is mapped in pairs of two adjacent symbols.

FIG. 8A is a schematic diagram of an example of single-symbol front-loaded DM-RS for configuration type 1. FIG. 8B is a schematic diagram of an example of single-symbol front-loaded DM-RS for configuration type 2. FIG. 8C is a schematic diagram of an example of double-symbol front-loaded DM-RS for configuration type 1. FIG. 8D is a schematic diagram of an example of double-symbol front-loaded DM-RS for configuration type 2. Code Division Multiplexing (CDM) groups are indicated by the different fill patterns. Type 1 and type 2 differ with respect to both the mapping structure and the number of supported DM-RS CDM groups (i.e., type 1 supports 2 CDM groups and type 2 supports 3 CDM groups). The mapping structure of type 1 is sometimes referred to as a 2-comb structure with two CDM groups defined, in frequency domain, by the set of subcarriers $\{0,2,4,\ldots\}$ and $\{1,3,5,\ldots\}$.

A DM-RS antenna port is mapped to the REs within one CDM group only. For single-symbol DM-RS, two antenna ports can be mapped to each CDM group whereas for double-symbol DM-RS four antenna ports can be mapped to each CDM group. Hence, the maximum number of DM-RS ports for type 1 is either four or eight. The maximum number of DM-RS ports for type 2 is either six or twelve. An Orthogonal Cover Code (OCC) of length 2 ([+1,+1],[+1,−1]) is used to separate antenna ports mapped on same REs within a CDM group. The OCC is applied in frequency domain as well as in time domain when double-symbol DM-RS is configured.

In NR Rel-15, the mapping of a PDSCH DM-RS sequence r(m), m=0,1, ... on antenna port $p_j$ and subcarrier k in OFDM symbol 1 for the numerology index μ is specified in 3GPP Technical Specification (TS) 38.211 as $$a_{k,l}^{(p_j,\mu)} = \beta_{DMRS}^{PDSCH} r_\lambda^{(p_j)}(2n + k')$$

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

where $$r_\lambda^{(p_j)}(2n + k') = w_f(k')w_t(l')r(2n + k')$$

represents the reference signal mapped on port $p_j$ in CDM group λ after applying OCC in frequency domain, $w_f(k')$, and time domain, $w_t(l')$. Table 1 and Table 2 show the PDSCH DM-RS mapping parameters for configuration type 1 and type 2, respectively.

TABLE 1

PDSCH DM-RS mapping parameters for configuration type 1.

| p | CDM group λ | Δ | $w_f(k')$ k'=0 | $w_f(k')$ k'=1 | $w_t(l')$ l'=0 | $w_t(l')$ l'=1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 2

PDSCH DM-RS mapping parameters for configuration type 2.

| p | CDM group λ | Δ | $w_f(k')$ k'=0 | $w_f(k')$ k'=1 | $w_t(l')$ | |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

Antenna Port Indication Tables

The DCI contains a bit field that selects which antenna ports and the number of antenna ports (i.e. the number of data layers) are scheduled. For example, if port 1000 is indicated, then the PDSCH is a single layer transmission and the UE will use the DM-RS defined by port 1000 to demodulate the PDSCH.

An example is shown in Table 3 below for DM-RS type 1 with a single front-loaded DM-RS symbol (max-Length=1). The DCI indicates a value and the number of DM-RS ports. The value indicated in DCI also indicates the number of CDM groups without data. If one CDM group without data is indicated, then the REs for the other CDM group without DM-RS will be used for PDSCH. If two CDM groups without data is indicated, both CDM groups may contain DM-RS and no data is mapped to the OFDM symbol which contains the DM-RS.

TABLE 3

Antenna port(s) (1000 + DM-RS port), dmrs-Type = 1, maxLength = 1
One Codeword: Codeword 0 enabled, Codeword 1 disabled

| Value | Number of DM-RS CDM group(s) without data | DM-RS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

For DM-RS Type 1, ports 1000 and 1001 are in CDM group λ=0 and ports 1002 and 1003 are in CDM group λ=1. When two front-load symbols are configured, two additional DM-RS ports are available in each CDM group.

Table 4 shows the corresponding table for DM-RS Type 2 with a single front-load DM-RS symbol.

TABLE 4

Antenna port(s) (1000 + DM-RS port), dmrs-Type = 2, maxLength = 1

| Value | Number of DM-RS CDM group(s) without data | DM-RS port(s) |
|---|---|---|
| One codeword: Codeword 0 enabled, Codeword 1 disabled | | |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 3 | 0 |
| 12 | 3 | 1 |
| 13 | 3 | 2 |
| 14 | 3 | 3 |
| 15 | 3 | 4 |
| 16 | 3 | 5 |
| 17 | 3 | 0, 1 |
| 18 | 3 | 2, 3 |
| 19 | 3 | 4, 5 |
| 20 | 3 | 0-2 |
| 21 | 3 | 3-5 |
| 22 | 3 | 0-3 |
| 23 | 2 | 0, 2 |
| 24-31 | Reserved | Reserved |
| Two codewords: Codeword 0 enabled, Codeword 1 enabled | | |
| 0 | 3 | 0-4 |
| 1 | 3 | 0-5 |
| 2-31 | reserved | reserved |

For DM-RS Type 2, ports 1000 and 1001 are in CDM group λ=0 and ports 1002 and 1003 are in CDM group λ=1. Ports 1004 and 1005 are in CDM group λ=2. When two front-load symbols are configured, two additional DM-RS ports are available in each CDM group. This is also indicated in Table 2.

Table 5 and Table 6 are the antenna port mapping tables for DM-RS with up to two front-loaded symbols.

TABLE 5

Antenna port(s) (1000 + DM-RS port), dmrs-Type = 1, maxLength = 2

| Value | Number of DM-RS CDM group(s) without data | DM-RS port(s) | Number of front-load symbols |
|---|---|---|---|
| *One Codeword: Codeword 0 enabled, Codeword 1 disabled* | | | |
| 0 | 1 | 0 | 1 |
| 1 | 1 | 1 | 1 |
| 2 | 1 | 0, 1 | 1 |
| 3 | 2 | 0 | 1 |
| 4 | 2 | 1 | 1 |
| 5 | 2 | 2 | 1 |
| 6 | 2 | 3 | 1 |
| 7 | 2 | 0, 1 | 1 |
| 8 | 2 | 2, 3 | 1 |
| 9 | 2 | 0-2 | 1 |
| 10 | 2 | 0-3 | 1 |
| 11 | 2 | 0, 2 | 1 |
| 12 | 2 | 0 | 2 |
| 13 | 2 | 1 | 2 |
| 14 | 2 | 2 | 2 |
| 15 | 2 | 3 | 2 |
| 16 | 2 | 4 | 2 |
| 17 | 2 | 5 | 2 |
| 18 | 2 | 6 | 2 |
| 19 | 2 | 7 | 2 |
| 20 | 2 | 0, 1 | 2 |
| 21 | 2 | 2, 3 | 2 |
| 22 | 2 | 4, 5 | 2 |
| 23 | 2 | 6, 7 | 2 |
| 24 | 2 | 0, 4 | 2 |
| 25 | 2 | 2, 6 | 2 |
| 26 | 2 | 0, 1, 4 | 2 |
| 27 | 2 | 2, 3, 6 | 2 |
| 28 | 2 | 0, 1, 4, 5 | 2 |
| 29 | 2 | 2, 3, 6, 7 | 2 |
| 30 | 2 | 0, 2, 4, 6 | 2 |
| 31 | Reserved | Reserved | Reserved |
| *Two Codewords: Codeword 0 enabled, Codeword 1 enabled* | | | |
| 0 | 2 | 0-4 | 2 |
| 1 | 2 | 0, 1, 2, 3, 4, 6 | 2 |
| 2 | 2 | 0, 1, 2, 3, 4, 5, 6 | 2 |
| 3 | 2 | 0, 1, 2, 3, 4, 5, 6, 7 | 2 |
| 4-31 | reserved | reserved | reserved |

TABLE 6

Antenna port(s) (1000 + DM-RS port), dmrs-Type = 2, maxLength = 2

| Value | Number of DM-RS CDM group(s) without data | DM-RS port(s) | Number of front-load symbols |
|---|---|---|---|
| *One codeword: Codeword 0 enabled, Codeword 1 disabled* | | | |
| 0 | 1 | 0 | 1 |
| 1 | 1 | 1 | 1 |
| 2 | 1 | 0, 1 | 1 |
| 3 | 2 | 0 | 1 |
| 4 | 2 | 1 | 1 |
| 5 | 2 | 2 | 1 |
| 6 | 2 | 3 | 1 |
| 7 | 2 | 0, 1 | 1 |
| 8 | 2 | 2, 3 | 1 |
| 9 | 2 | 0-2 | 1 |
| 10 | 2 | 0-3 | 1 |
| 11 | 3 | 0 | 1 |
| 12 | 3 | 1 | 1 |
| 13 | 3 | 2 | 1 |
| 14 | 3 | 3 | 1 |
| 15 | 3 | 4 | 1 |
| 16 | 3 | 5 | 1 |
| 17 | 3 | 0, 1 | 1 |
| 18 | 3 | 2, 3 | 1 |
| 19 | 3 | 4, 5 | 1 |
| 20 | 3 | 0-2 | 1 |
| 21 | 3 | 3-5 | 1 |
| 22 | 3 | 0-3 | 1 |
| 23 | 2 | 0, 2 | 1 |
| 24 | 3 | 0 | 2 |
| 25 | 3 | 1 | 2 |
| 26 | 3 | 2 | 2 |
| 27 | 3 | 3 | 2 |
| 28 | 3 | 4 | 2 |
| 29 | 3 | 5 | 2 |
| 30 | 3 | 6 | 2 |
| 31 | 3 | 7 | 2 |
| 32 | 3 | 8 | 2 |
| 33 | 3 | 9 | 2 |
| 34 | 3 | 10 | 2 |
| 35 | 3 | 11 | 2 |
| 36 | 3 | 0, 1 | 2 |
| 37 | 3 | 2, 3 | 2 |
| 38 | 3 | 4, 5 | 2 |
| 39 | 3 | 6, 7 | 2 |
| 40 | 3 | 8, 9 | 2 |
| 41 | 3 | 10, 11 | 2 |
| 42 | 3 | 0, 1, 6 | 2 |
| 43 | 3 | 2, 3, 8 | 2 |
| 44 | 3 | 4, 5, 10 | 2 |
| 45 | 3 | 0, 1, 6, 7 | 2 |
| 46 | 3 | 2, 3, 8, 9 | 2 |
| 47 | 3 | 4, 5, 10, 11 | 2 |
| 48 | 1 | 0 | 2 |
| 49 | 1 | 1 | 2 |
| 50 | 1 | 6 | 2 |
| 51 | 1 | 7 | 2 |
| 52 | 1 | 0, 1 | 2 |
| 53 | 1 | 6, 7 | 2 |
| 54 | 2 | 0, 1 | 2 |
| 55 | 2 | 2, 3 | 2 |
| 56 | 2 | 6, 7 | 2 |
| 57 | 2 | 8, 9 | 2 |
| *Two Codewords: Codeword 0 enabled, Codeword 1 enabled* | | | |
| 0 | 3 | 0-4 | 1 |
| 1 | 3 | 0-5 | 1 |
| 2 | 2 | 0, 1, 2, 3, 6 | 2 |
| 3 | 2 | 0, 1, 2, 3, 6, 8 | 2 |
| 4 | 2 | 0, 1, 2, 3, 6, 7, 8 | 2 |
| 5 | 2 | 0, 1, 2, 3, 6, 7, 8, 9 | 2 |
| 6-63 | Reserved | Reserved | Reserved |

Mapping Between TCI States and DM-RS CDM Groups

It has been agreed in 3GPP that each CDM group can be mapped to only one TCI state. In case two TCI states are indicated in a DCI and DM-RS ports in two CDM groups are signaled, the first TCI state is mapped to the first CDM group and the second TCI state is mapped to the second CDM group. In case of type 2 and DM-RS ports in 3 CDM groups are indicated in the DCI, then the mapping is still to be determined in 3GPP.

There currently exist certain challenge(s). One problem of using multi-TRP for reliable PDSCH transmission is how to dynamically indicate to a UE which scheme, i.e., SDM/TDM/FDM, is used for a PDSCH transmission.

SUMMARY

Dynamic indication of multi-Transmission/Reception Point (TRP) Physical Downlink Shared Channel (PDSCH) transmission is provided. A solution is proposed to use an antenna port field (e.g., a Demodulation Reference Signal (DM-RS) port indication field) in Downlink Control Information (DCI) to jointly indicate both the DM-RS ports and the scheme used for a PDSCH transmission. When more than one Transmission Configuration Indicator (TCI) state is indicated in a DCI, a new DM-RS table is used in which a DM-RS port allocation is also linked to a transmission scheme. The solution enables flexible PDSCH scheduling without introducing additional DCI overhead.

There are, proposed herein, various embodiments which address one or more of the issues discussed above. In some embodiments, a method performed by a wireless device in a wireless network for determining a PDSCH transmission scheme from a plurality of PDSCH transmission schemes is provided. The method includes receiving, from a network node, a list of configured TCI states and a plurality of antenna port tables; receiving DCI comprising a TCI field and an antenna port field; determining a transmission scheme for a plurality of PDSCH transmissions based on the TCI field and the antenna port field in the DCI; and configuring the wireless device to receive the plurality of PDSCH transmissions according to the transmission scheme.

In some embodiments, the one or more antenna port tables comprise a plurality of antenna port tables. In some embodiments, the method further comprises selecting a DM-RS port table, optionally from the plurality of antenna port tables, based on one or more of: a number of the indicated TCI states in the DCI, a configured DM-RS type, or a maximum number of front-load symbols for the plurality of PDSCH transmissions. In some embodiments, the antenna port field in the DCI indicates one or more DM-RS ports in one or more Code Division Multiplexing (CDM) groups for the plurality of PDSCH transmissions according to the selected DM-RS port table. In some embodiments, configuring the wireless device to receive the plurality of PDSCH transmissions comprises applying the plurality of TCI states and the one or more DM-RS ports when receiving the plurality of PDSCH transmissions.

In some embodiments, the DCI is received over a Physical Downlink Control Channel (PDCCH) with DCI format 1-1.

In some embodiments, the DCI further comprises a Redundancy Version (RV) field; and the method further comprises determining an RV for each of the plurality of PDSCH transmissions based on the RV field in the DCI according to the determined transmission scheme. In some embodiments, the TCI field indicates a plurality of TCI states out of the list of configured TCI states; and the RV field indicates a plurality of RVs from a set of pre-specific RV values. In some embodiments, the transmission scheme is a mini-slot-based Time Division Multiplexing (TDM) PDSCH repetition scheme in which a PDSCH is repeated in multiple non-overlapping mini-slots within a time slot with each repetition associated to a different RV and a different TCI state. In some embodiments, the different TCI states associated to the PDSCH transmissions are indicated by the TCI field in the DCI; a first indicated TCI state is associated to a first PDSCH transmission of the plurality of PDSCH transmissions; and a second indicated TCI state is associated to a second PDSCH transmission of the plurality of PDSCH transmissions. In some embodiments, the first PDSCH transmission is received prior to the second PDSCH transmission.

In some embodiments, the transmission scheme is a Frequency Division Multiplexing (FDM) multi-RV PDSCH repetition scheme in which a PDSCH is repeated in multiple non-overlapping frequency resources in a same time slot with each repetition associated to a different RV and a different TCI state. In some embodiments, the different TCI states associated to the PDSCH transmissions are indicated by the TCI field in the DCI; a first indicated TCI state is associated to a first PDSCH transmission of the plurality of PDSCH transmissions; and a second indicated TCI state is associated to a second PDSCH transmission of the plurality of PDSCH transmissions. In some embodiments, the first PDSCH transmission is received on a first frequency domain resource with a starting Resource Block (RB) having a smaller index value than a starting RB of a second frequency domain resource allocated for the second PDSCH transmission.

In some embodiments, determining the RV for each of the plurality of PDSCH transmissions based on the RV field in the DCI comprises determining different RVs according to the following table:

| RV field value in DCI | RVs for the first and second PDSCH transmissions | |
|---|---|---|
| | $1^{st}$ PDCCH transmission associated with 1st TCI state | $2^{nd}$ PDSCH transmission associated with 2nd TCI state |
| 0 | 0 | 2 |
| 1 | 2 | 3 |
| 2 | 3 | 1 |
| 3 | 1 | 0 |

In some embodiments, the transmission scheme comprises one or more of: a Spatial Division Multiplexing (SDM) scheme; a first FDM scheme with a single RV; a second FDM scheme with multiple RVs; a mini-slot-based TDM scheme; or a slot-based TDM scheme.

In some embodiments, the transmission scheme comprises one or more of: a combination of SDM and single-RV-based FDM; a combination of single-RV-based FDM and slot-based TDM; a combination of single-RV-based FDM and mini-slot-based TDM; a combination of SDM and slot-based TDM; or a combination of SDM and mini-slot-based TDM.

In some embodiments, the method further comprises receiving an assignment of two or more allocation tables for determining the transmission scheme from the antenna port field in the DCI.

In some embodiments, a method performed by a base station for signaling a transmission scheme in a wireless network comprising a User Equipment (UE) and a plurality of Transmission/Reception Points (TRPs), wherein each TRP is optionally associated with a TCI state, is provided. The method includes signaling at least two TCI states and at least two RVs in a DCI; and signaling, to the UE, a transmission scheme for a plurality of PDSCH transmissions via an antenna port field in the DCI.

In some embodiments, the method further comprises assigning an RV of the at least two RVs and a TCI state of the at least two TCI states for each of the plurality of PDSCH transmissions; and sending the plurality of PDSCH transmissions according to the transmission scheme, the at least two TCI states, and the at least two RVs. In some embodiments, assigning the RV of the at least two RVs and the TCI state of the at least two TCI states for each of the plurality of PDSCH transmissions comprises allocating different RVs and TCI states according to the following table:

| RV field value in DCI | RVs for the first and second PDSCH transmissions | |
|---|---|---|
| | 1st PDCCH transmission associated with 1st TCI state | 2nd PDSCH transmission associated with 2nd TCI state |
| 0 | 0 | 2 |
| 1 | 2 | 3 |
| 2 | 3 | 1 |
| 3 | 1 | 0 |

In some embodiments, the DCI is signaled to the UE over a PDCCH with DCI format 1-1.

In some embodiments, the antenna port field in the DCI further indicates one or more DM-RS ports in one or CDM groups for the plurality of PDSCH transmissions. In some embodiments, a value of the antenna port field is set according to a DM-RS port table in response to configuring the at least two TCI states. In some embodiments, the method further comprises selecting the DM-RS port table based on one or more of: the at least two TCI states, a configured DM-RS type, or a maximum number of front-load symbols.

In some embodiments, the transmission scheme is a mini-slot based TDM scheme in which a PDSCH is repeated in multiple non-overlapping mini-slots within a time slot with each repetition having a different RV and associated with a different TCI state. In some embodiments, the method further comprises indicating in the DCI the different TCI states associated with the plurality of PDSCH transmissions; wherein a first indicated TCI state is associated with a first PDSCH transmission of the plurality of PDSCH transmissions; and a second indicated TCI state is associated with a second PDSCH transmission of the plurality of PDSCH transmissions. In some embodiments, the method further comprises transmitting the first PDSCH transmission prior to transmitting the second PDSCH transmission.

In some embodiments, the transmission scheme is an FDM multi-RV PDSCH repetition scheme in which a PDSCH is repeated in multiple non-overlapping frequency resources in a same time slot with each repetition associated to a different RV and a different TCI state. In some embodiments, the method further comprises indicating in the DCI the different TCI states associated with the plurality of PDSCH transmissions; wherein a first indicated TCI state is associated with a first PDSCH transmission of the plurality of PDSCH transmissions; and a second indicated TCI state is associated with a second PDSCH transmission of the plurality of PDSCH transmissions. In some embodiments, the method further comprises transmitting the first PDSCH transmission on a first frequency domain resource with a starting RB having a smaller index value than a starting RB of a second frequency domain resource allocated for the second PDSCH transmission.

In some embodiments, the method further comprises assigning two or more allocation tables to the UE for determining the transmission scheme. In some embodiments, a value of the antenna port field is set by: selecting one of the two or more allocation tables for the plurality of PDSCH transmissions; and identifying one or more rows in the selected one allocation table indicating a desired transmission scheme. In some embodiments, entries of the two or more allocation tables depend on the UE's capability in supporting one or more transmission schemes indicated by the two or more allocation tables. In some embodiments, the two or more allocation tables are signaled to the UE through higher layer signaling.

In some embodiments, the transmission scheme comprises one or more of: a SDM scheme; a first FDM scheme with a single RV; a second FDM scheme with multiple RVs; a mini-slot-based TDM scheme; or a slot-based TDM scheme.

In some embodiments, the transmission scheme comprises one or more of: a combination of SDM and single-RV-based FDM; a combination of single-RV-based FDM and slot-based TDM; a combination of single-RV-based FDM and mini-slot-based TDM; a combination of SDM and slot-based TDM; or a combination of SDM and mini-slot-based TDM.

In some embodiments, a wireless device is adapted to perform the method of any of the above embodiments. In some embodiments, the wireless device includes processing circuitry adapted to perform the method of any of the above embodiments.

In some embodiments, a base station is adapted to perform the method of any of the above embodiments.

In some embodiments, a method performed by a wireless device in a wireless network for determining a PDSCH transmission scheme from a plurality of PDSCH transmission schemes is provided. The method includes receiving, from a network node, a configuration of a list of TCI states and one or more antenna port tables; receiving DCI comprising a TCI field, an antenna port field, and an RV field; determining a transmission scheme for a plurality of PDSCH transmissions based on the TCI field and the antenna port field in the DCI; and configuring the wireless device to receive the plurality of PDSCH transmissions according to the transmission scheme.

In some embodiments, the one or more antenna port tables are a plurality of antenna port tables. In some embodiments, the method further comprises determining an antenna table among the plurality of antenna port tables based on a number of the TCI states indicated in a TCI field.

In some embodiments, the method further comprises interpreting the RV field according to the determined transmission scheme.

In some embodiments, a method performed by a wireless device in a wireless network for determining a PDSCH transmission scheme from a plurality of PDSCH transmission schemes is provided. The method includes receiving, from a network node, a configuration of a list of TCI states and a plurality of antenna port tables; receiving DCI comprising a TCI field, an antenna port field, and an RV field; determining an antenna table among the plurality of antenna port tables based on a number of the TCI states indicated in the TCI field; determining a transmission scheme for a plurality of PDSCH transmissions based on the TCI field and the antenna port field in the DCI; interpreting the RV field according to the determined transmission scheme; and configuring the wireless device to receive the plurality of PDSCH transmissions according to the transmission scheme.

In some embodiments, a method performed by a wireless device in a wireless network for determining a PDSCH transmission scheme from a plurality of PDSCH transmission schemes is provided. The method includes receiving, from a network node, a configuration of a list of TCI states and a plurality of antenna port tables; receiving DCI comprising a TCI field, an antenna port field, and an RV field; determining a transmission scheme for a plurality of PDSCH transmissions based on the TCI field and the antenna port field in the DCI; determining an RV for each of the plurality of PDSCH transmissions based on the RV field according to the determined transmission scheme; and configuring the wireless device to receive the plurality of PDSCH transmissions according to the transmission scheme.

In some embodiments, a DM-RS port table is further selected from the plurality of antenna port tables based on a number of indicated TCI states in the DCI, a configured DM-RS type, and a maximum number of front-load symbols.

In some embodiments, a wireless device is adapted to perform the method of any of the above embodiments.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 1 is a schematic diagram of an example New Radio (NR) time-domain data scheduling structure with 15 kilohertz (kHz) subcarrier spacing.

FIG. 2 is a schematic diagram of a basic NR physical time-frequency resource grid.

FIG. 8A is a schematic diagram of an example of single-symbol front-loaded Demodulation Reference Signal (DM-RS) for configuration type 1.

FIG. 8B is a schematic diagram of an example of single-symbol front-loaded DM-RS for configuration type 2.

FIG. 8C is a schematic diagram of an example of double-symbol front-loaded DM-RS for configuration type 1.

FIG. 8D is a schematic diagram of an example of double-symbol front-loaded DM-RS for configuration type 2.

FIG. 11A is a flowchart illustrating a method in accordance with particular embodiments.

FIG. 11B is a flowchart illustrating an alternative embodiment of the method of FIG. 11A.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 3:
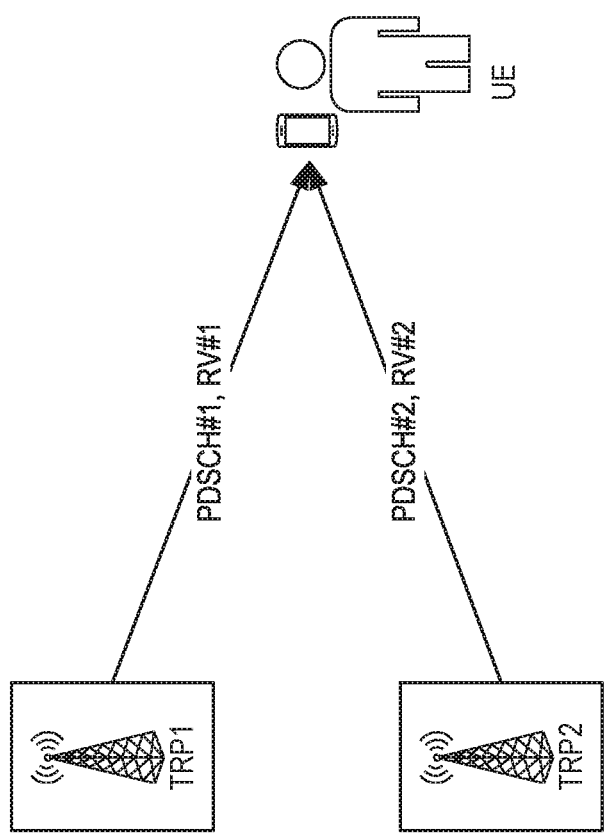
FIG. 3 is a schematic diagram of an example data transmission over multiple Transmission/Reception Points (TRPs) for increasing reliability.
Figure 4A:
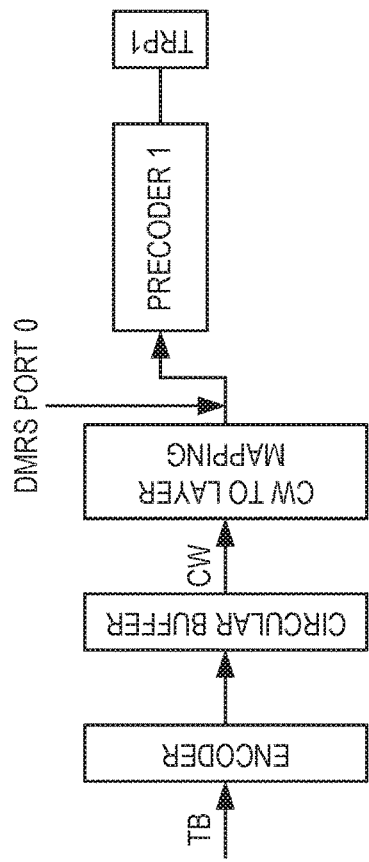
FIG. 4A is a schematic diagram of a single TRP Physical Downlink Shared Channel (PDSCH) transmission scheme.
Figure 4B:
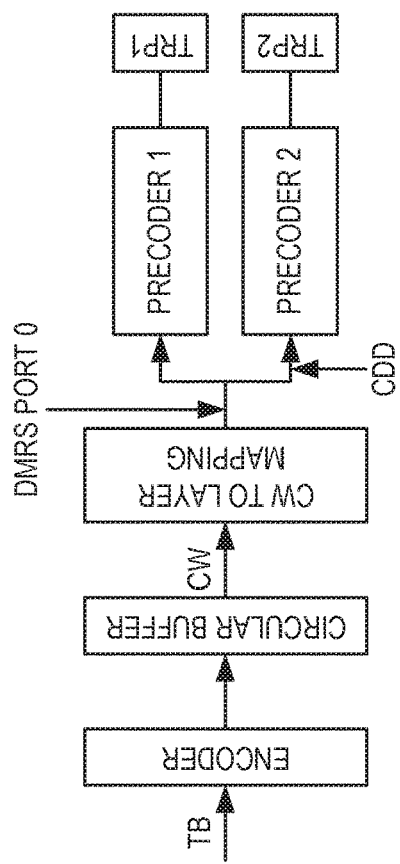
FIG. 4B is a schematic diagram of a Single Frequency Network (SFN) with Cyclic Delay Diversity (CDD) PDSCH transmission scheme.
Figure 4C:
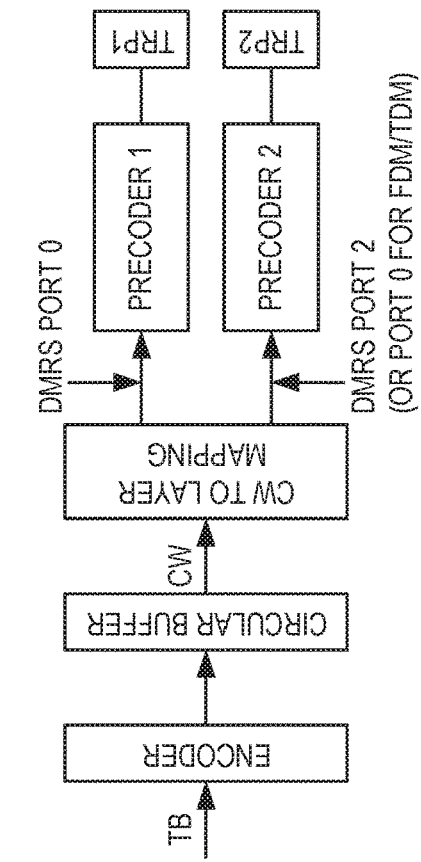
FIG. 4C is a schematic diagram of a Spatial Division Multiplexing (SDM)/Frequency Domain Multiplexing (FDM) with a single Codeword (CW) and a single Redundancy Version (RV) PDSCH transmission scheme.
Figure 4D:
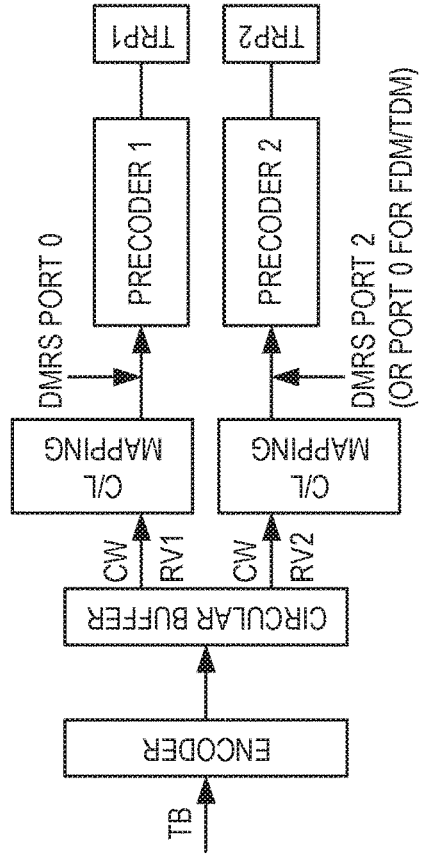
FIG. 4D is a schematic diagram of SDM/FDM/Time Domain Multiplexing (TDM) with two CWs each with a different RV (i.e., RV1 and RV2), referred to as multi-RV PDSCH transmission scheme.
Figure 5:
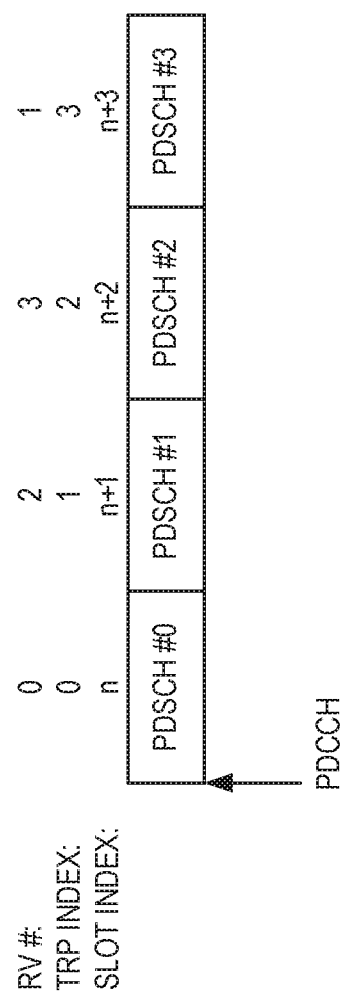
FIG. 5 is a schematic diagram of an example slot-based TDM scheme for PDSCH transmissions over multiple TRPs.
Figure 6:
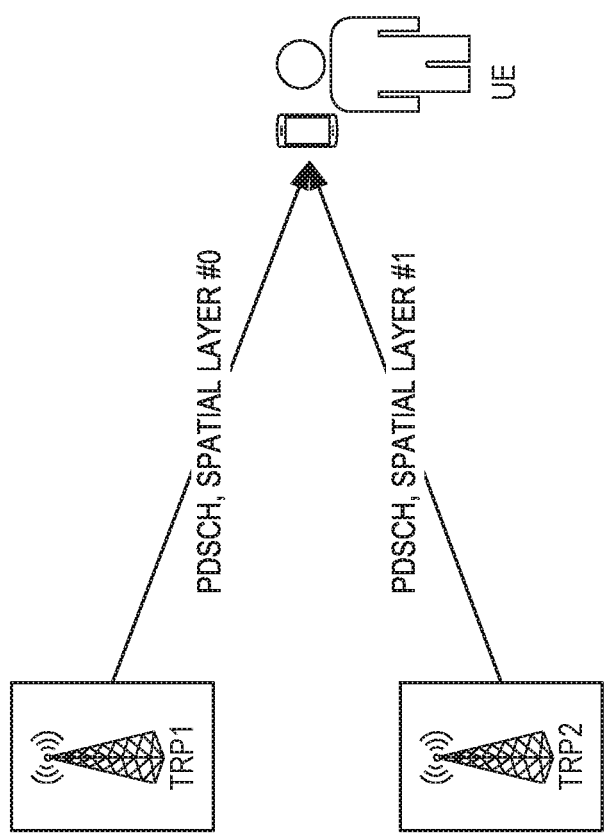
FIG. 6 is a schematic diagram of an example data transmission over multiple TRPs under an SDM scheme.
Figure 7A:
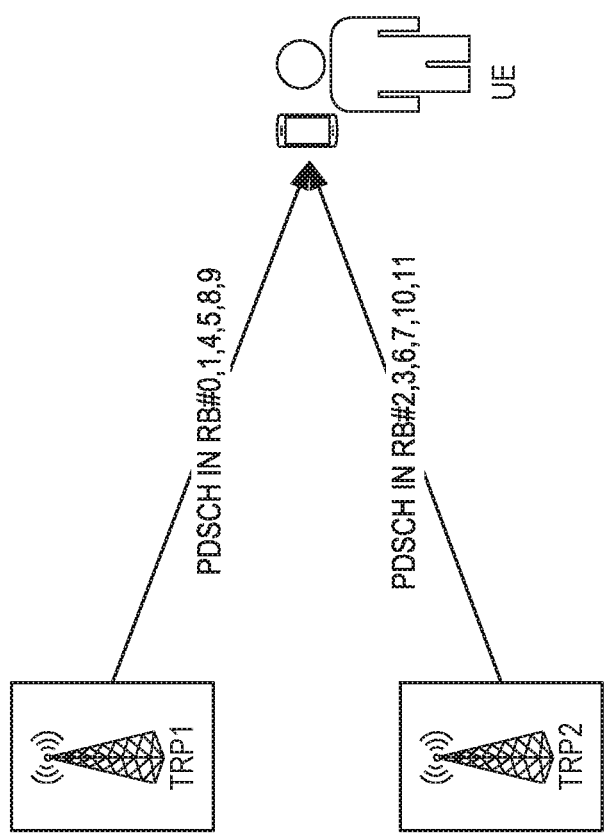
FIG. 7A is a schematic diagram of an example data transmission over multiple TRPs under an FDM scheme.
Figure 7B:
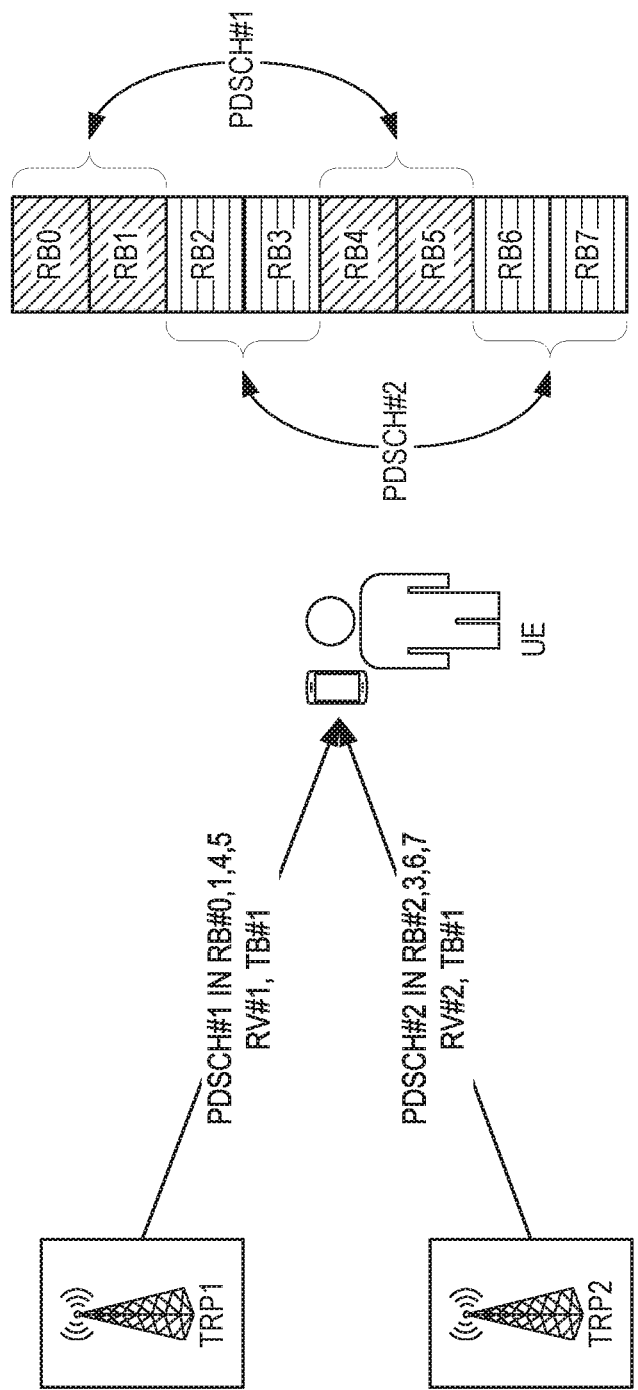
FIG. 7B is a schematic diagram of an example data transmission over multiple TRPs under an FDM multi-RV scheme.
Figure 7C:
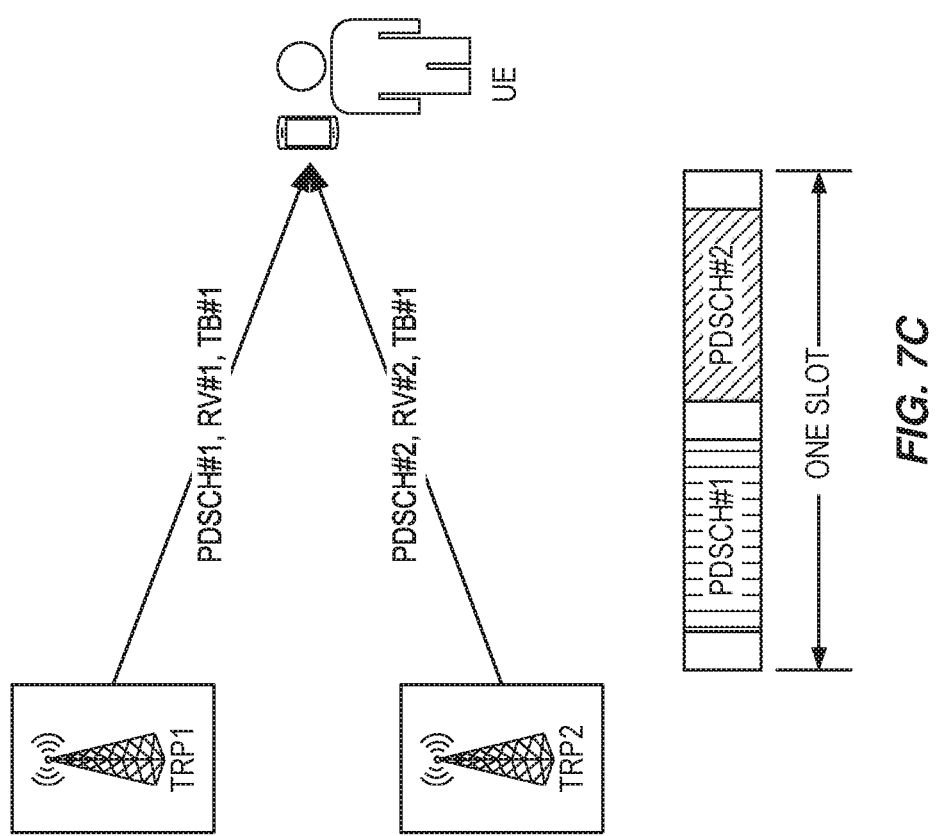
FIG. 7C is a schematic diagram of an example data transmission over multiple TRPs under a mini-slot-based TDM scheme.
Figure 9:
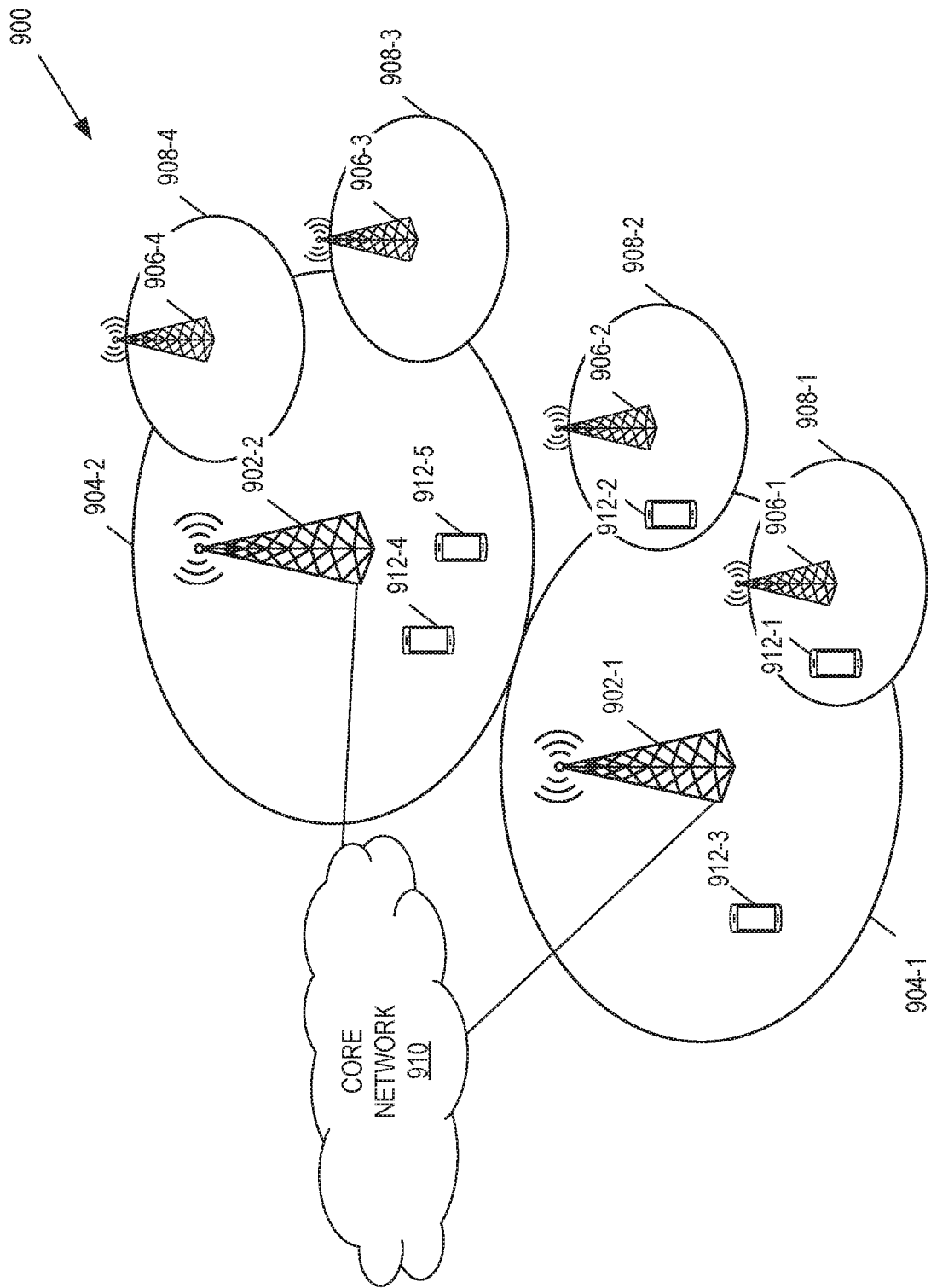
FIG. 9 illustrates one example of a cellular communications network according to some embodiments of the present disclosure.

FIG. 9 illustrates one example of a cellular communications network 900 according to some embodiments of the present disclosure. In the embodiments described herein, the cellular communications network 900 is a 5G NR network. In this example, the cellular communications network 900 includes base stations 902-1 and 902-2, which in LTE are referred to as eNBs and in 5G NR are referred to as gNBs, controlling corresponding macro cells 904-1 and 904-2. The base stations 902-1 and 902-2 are generally referred to herein collectively as base stations 902 and individually as base station 902. Likewise, the macro cells 904-1 and 904-2 are generally referred to herein collectively as macro cells 904 and individually as macro cell 904. The cellular communications network 900 may also include a number of low power nodes 906-1 through 906-4 controlling corresponding small cells 908-1 through 908-4. The low power nodes 906-1 through 906-4 can be small base stations (such as pico or femto base stations) or Remote Radio Heads (RRHs), or the like. Notably, while not illustrated, one or more of the small cells 908-1 through 908-4 may alternatively be provided by the base stations 902. The low power nodes 906-1 through 906-4 are generally referred to herein collectively as low power nodes 906 and individually as low power node 906. Likewise, the small cells 908-1 through 908-4 are generally referred to herein collectively as small cells 908 and individually as small cell 908. The base stations 902 (and optionally the low power nodes 906) are connected to a core network 910.

The base stations 902 and the low power nodes 906 provide service to wireless devices 912-1 through 912-5 in the corresponding cells 904 and 908. The wireless devices 912-1 through 912-5 are generally referred to herein collectively as wireless devices 912 and individually as wireless device 912. The wireless devices 912 are also sometimes referred to herein as UEs.

In an exemplary aspect described herein, the cellular communications network 900 may use multiple Transmission/Reception Points (TRPs) (e.g., base stations 902, low power nodes 906) for Physical Downlink Shared Channel (PDSCH) transmission to increase reliability. However, traditional multi-TRP approaches lack a mechanism to dynamically indicate to a UE (e.g., wireless device 912) the transmission scheme used for a PDSCH transmission in cases where more than one Transmission Configuration Indication (TCI) state is used. Embodiments described below enable flexible PDSCH scheduling without introducing additional Downlink Control Information (DCI) overhead. Example processes for implementing flexible PDSCH scheduling are further described below with respect to FIGS. 10A-12.

Dynamic Indication of Multi-TRP PDSCH Schemes with Demodulation Reference Signal (DM-RS) Port Indication In some embodiments described herein, the antenna port(s) field in DCI format 1-1 is used to indicate both the DM-RS ports used as well as the multi-TRP scheme for a scheduled PDSCH. More specifically, when more than one TCI state is indicated in the TCI field in the DCI scheduling the PDSCH, a new DM-RS port table is used for a given DM-RS type and the maximum number of front-loaded symbols. That is, which DM-RS port indication table is used, the legacy one or the new one, depends on whether a single or multiple TCI states are indicated by the TCI field, meaning that the interpretation of the DM-RS port indication field depends on the TCI field.

An example is shown in Table 7, where a "scheme" column is also included. A multi-TRP scheme is indicated by setting the corresponding value in the antenna port field in the DCI. For example, when the value of antenna port field is in the range of 0 to 3, Spatial Division Multiplexing (SDM) scheme is indicated. The table assumes up to two spatial layers per TRP. Note that although the above discussion refers to DCI format 1-1, this embodiment is also applicable to other DCI formats that may include the antenna ports field.

TABLE 7

An example of new DM-RS port table for DM-RS type 1 when more than one TCI state is indicated in DCI.
one CW, DM-RS type 1, MaxLength = 1

| Value of antenna port field in DCI | # of CDM group(s) without data | DM-RS port(s) | Scheme |
| --- | --- | --- | --- |
| 0 | 2 | 0-2 | SDM |
| 1 | 2 | 0-3 | |
| 2 | 2 | 0, 2 | |
| 3 | 2 | 0, 2, 3 | |
| 4 | 1 | 0 | Mini-slot based |
| 5 | 1 | 0-1 | TDM |
| 6 | 1 | 0 | Slot based TDM |
| 7 | 1 | 0-1 | |
| 8 | 1 | 0 | Single-RV based |
| 9 | 1 | 0-1 | FDM |
| 10 | 1 | 0 | Multi-RV based |
| 11 | 1 | 0-1 | FDM |
| 12 to 15 | reserved | reserved | reserved |

Similarly, new DM-RS tables for DM-RS Type 1 with maximum two front-symbols and DM-RS Type 2 with one and maximum two front-load symbols can be introduced to indicate the multi-TRP schemes. Examples are shown in Table 8 to Table 10.

TABLE 8

An example of new DM-RS port table for DM-RS type 1 with maximum 2 front-load symbols.
one CW, DM-RS type 1, MaxLength = 2

| Value of antenna port field in DCI | # of CDM group(s) without data | DM-RS port(s) | Number of front-load symbols | Scheme |
| --- | --- | --- | --- | --- |
| 0 | 2 | 0-2 | 1 | SDM |
| 1 | 2 | 0-3 | 1 | |
| 2 | 2 | 0, 2 | 1 | |
| 3 | 2 | 0, 2, 3 | 1 | |
| 4 | 1 | 0 | 1 | Mini-slot based |
| 5 | 1 | 0-1 | 1 | TDM |
| 6 | 1 | 0, 1, 4 | 2 | |
| 7 | 1 | 0, 1, 4, 5 | 2 | |
| 8 | 1 | 0 | 1 | Slot based TDM |
| 9 | 1 | 0-1 | 1 | |
| 10 | 1 | 0, 1, 4 | 2 | |
| 11 | 1 | 0, 1, 4, 5 | 2 | |
| 12 | 1 | 0 | 1 | Single-RV based |
| 13 | 1 | 0-1 | 1 | FDM |
| 14 | 1 | 0, 1, 4 | 2 | |
| 15 | 1 | 0, 1, 4, 5 | 2 | |
| 16 | 1 | 0 | 1 | FDM multi-RV |
| 17 | 1 | 0-1 | 1 | |
| 18 | 1 | 0, 1, 4 | 2 | |
| 19 | 1 | 0, 1, 4, 5 | 2 | |
| 20-31 | | reserved | | |

TABLE 9

An example of new DM-RS port table for DM-RS
type 2 with maximum 1 front-load symbols
one CW, DM-RS type 2, maxLength = 1

| Value of antenna port field in DCI | # of CDM group(s) without data | DM-RS port(s) | Scheme |
|---|---|---|---|
| 0 | 2 | 0-2 | SDM |
| 1 | 2 | 0-3 | |
| 2 | 2 | 0, 2 | |
| 3 | 2 | 0, 2, 3 | |
| 4 | 1 | 0 | Mini-slot based TDM |
| 5 | 1 | 0-1 | |
| 6 | 1 | 0 | Slot based TDM |
| 7 | 1 | 0-1 | |
| 8 | 1 | 0 | Single-RV based FDM |
| 9 | 1 | 0-1 | |
| 10 | 1 | 0 | Multi-RV based FDM |
| 11 | 1 | 0-1 | |
| 12 to 15 | reserved | reserved | reserved |

TABLE 10

An example of new DM-RS port table for DM-RS
type 2 with maximum 2 front-load symbols
one CW, DM-RS type 2, MaxLength = 2

| Value of antenna port field in DCI | # of CDM group(s) without data | DM-RS port(s) | Number of front-load symbols | Scheme |
|---|---|---|---|---|
| 0 | 2 | 0-2 | 1 | SDM |
| 1 | 2 | 0-3 | 1 | |
| 2 | 2 | 0, 2 | 1 | |
| 3 | 2 | 0, 2, 3 | 1 | |
| 4 | 1 | 0 | 1 | Mini-slot based TDM |
| 5 | 1 | 0-1 | 1 | |
| 6 | 1 | 0, 1, 6 | 2 | |
| 7 | 1 | 0, 1, 6, 7 | 2 | |
| 8 | 1 | 0 | 1 | Slot based TDM |
| 9 | 1 | 0-1 | 1 | |
| 10 | 1 | 0, 1, 6 | 2 | |
| 11 | 1 | 0, 1, 6, 7 | 2 | |
| 12 | 1 | 0 | 1 | Single-RV based FDM |
| 13 | 1 | 0-1 | 1 | |
| 14 | 1 | 0, 1, 6 | 2 | |
| 15 | 1 | 0, 1, 6, 7 | 2 | |
| 16 | 1 | 0 | 1 | FDM multi- RV |
| 17 | 1 | 0-1 | 1 | |
| 18 | 1 | 0, 1, 6 | 2 | |
| 19 | 1 | 0, 1, 6, 7 | 2 | |
| 20-63 | | | reserved | |

For Time Domain Multiplexing (TDM) schemes and Frequency Domain Multiplexing (FDM) with multi-Redundancy Version (RV), the RV sequence can be indicated by the RV field in the DCI. An example is shown in Table 11, where RV to TCI state association is indicated by the RV field. TCI state #0 corresponds to the first TCI state indicated in the DCI. Up to 4 TCI states can be supported. For TDM schemes, the first slot or mini-slot is associated with TCI state #0. That is, the interpretation of the RV field is dependent on whether the DM-RS port indication field indicates "FDM multi-RV" or not, where the interpretation of the DM-RS port indication field in turn is dependent on the TCI field.

TABLE 11

An example of using the RV field in DCI to indicate RV to TCI state
associations when more than one TCI state is indicated in DCI.

| RV field | TCI state #0 | TCI state #1 | TCI state #2 | TCI state #3 |
|---|---|---|---|---|
| 0 | 0 | 2 | 3 | 1 |
| 1 | 2 | 3 | 1 | 0 |
| 2 | 3 | 1 | 0 | 2 |
| 3 | 1 | 0 | 2 | 3 |

In the above example, one may notice that, for the particular case of FDM multi-RV based repetition, there may be some overlap between RV indication and multiple TCI state indication. For instance, the combination of (TCI states, RV)=((TCI-A, TCI-B, TCI-C, TCI-D), 1) will result in the same transmission as (TCI states, RV)=((TCI-B, TCI-C, TCI-D, TCI-A), 0), where TCI-A/B/C/D correspond to TCI state #0/1/2/3, respectively. That is, if it is allowed to permutate the order of indicated TCI states belonging to a codepoint of the TCI field, it is possible to re-use the RV Indicator (RVI) field to indicate another set of information. In one embodiment, the RV field is used to indicate different frequency domain resource allocations for the respective repetitions.

Dynamic Indication of Combination of Multi-TRP PDSCH Schemes with DM-RS Port Indication In some embodiments, the antenna port(s) field in DCI format 1-1 is used to indicate both the DM-RS ports used as well as one or more combination of multi-TRP schemes for a scheduled PDSCH. The one or more combination of multi-TRP schemes for a scheduled PDSCH may include any of the following options:

A combination of SDM and single-RV-based FDM.
A combination of single-RV-based FDM and slot-based TDM.
A combination of single-RV-based FDM and mini-slot-based TDM.
A combination of SDM and slot-based TDM.
A combination of SDM and mini-slot-based TDM.

Note that other multi-TRP scheme combinations not listed above are also possible.

In this embodiment, when more than one TCI state is indicated in the transmission configuration indication field in the DCI scheduling the PDSCH, a new DM-RS port indication table is used for a given DM-RS type and the maximum number of front-loaded symbols.

An example is shown in Table 12 where the column 'scheme', depending on the Value indicated in the antenna ports field, indicates one of SDM, a combination of SDM and slot-based TDM, or a combination of SDM and single-RV-based FDM.

TABLE 12

An example of new DM-RS port table for DM-RS type 1 when
more than one TCI state is indicated in DCI which includes
indicating a combination of multi-TRP schemes.
one CW, DM-RS type 1, MaxLength = 1

| Value | # of CDM group(s) without data | DM-RS port(s) | Scheme |
|---|---|---|---|
| 0 | 2 | 0-2 | SDM |
| 1 | 2 | 0-3 | |
| 2 | 2 | 0, 2 | |
| 3 | 2 | 0, 2, 3 | |
| 4 | 2 | 0-2 | Combination of SDM |

TABLE 12-continued

An example of new DM-RS port table for DM-RS type 1 when more than one TCI state is indicated in DCI which includes indicating a combination of multi-TRP schemes.
one CW, DM-RS type 1, MaxLength = 1

| Value | # of CDM group(s) without data | DM-RS port(s) | Scheme |
|---|---|---|---|
| 5 | 2 | 0-3 | and slot-based TDM |
| 6 | 2 | 0, 2 | |
| 7 | 2 | 0, 2, 3 | |
| 8 | 2 | 0-2 | Combination of SDM |
| 9 | 2 | 0-3 | and single-RV based |
| 10 | 2 | 0, 2 | FDM |
| 11 | 2 | 0, 2, 3 | |
| 12 to 15 | reserved | reserved | reserved |

In the example of Table 12, if the value indicated in the antenna ports field is 6, then two layers are transmitted from two TRPs in DM-RS ports 0 and 2 in one slot. In the next slot, repetitions of the same Transport Block (TB) possibly with different RV are transmitted with two layers from two TRPs in DM-RS ports 0 and 2. Hence, a combination of SDM and slot-based TDM is achieved and the UE can know which combination is being used based on the value indicated in the antenna ports field.

Similarly, in the example of Table 12, if the value indicated in the antenna ports field is 11, then three layers are transmitted from two TRPs in DM-RS ports 0, 2, and 3 in one set of Resource Blocks (RBs) in the frequency domain. In a second set of RBs in the frequency domain, repetitions of the same TB are transmitted again with three layers from the two TRPs in DM-RS ports 0, 2, and 3. Hence, a combination of SDM and single-RV based FDM is achieved and the UE can know which combination is used based on the value indicated in the antenna ports field.

Although only two combinations are shown in the example of Table 12, the embodiment is non-limiting and any combination of multi-TRP scheme discussed above can be indicated via the new DM-RS port table when multiple TCI states are indicated in the transmission configuration indication field in TCI. Similar tables can be defined for DM-RS type 1 with two front-loaded DM-RS symbols, DM-RS type 2 with single front loaded DM-RS symbols, and DM-RS type 2 with two front-loaded DM-RS symbols.

Note that although the above discussion refers to DCI format 1-1, this embodiment is also applicable to other DCI formats that may include the antenna ports field.

Dynamic Indication of Multi-TRP PDSCH Schemes with Restrictions on Value Indicated in Antenna Ports Field In some cases, which Multi-TRP PDSCH scheme or which combination of multi-TRP PDSCH schemes a UE supports may depend on the UE's capability. The UE may indicate to the network the schemes or combination of schemes it supports via UE capability signaling. In this embodiment, a rule may be defined such that the UE only expects the antenna port field values that indicate a multi-TRP scheme which is supported by UE.

Take the example in Table 7. A UE capable of supporting only single-RV FDM cannot support the other multi-TRP schemes listed in Table 7. In this case, when the transmission configuration indication field indicates two TCI states, the UE can expect the value of the antenna ports field to be either 9 or 10. If some other value is indicated in the antenna ports field, the UE ignores the PDSCH transmission.

In a variant of this embodiment, the DM-RS port indication table itself depends on the UE's capability signaling.

For instance, a UE supporting both single-RV FDM and slot-based TDM is assigned a first DM-RS port indication table whereas a UE only supporting single-RV FDM is allocated another, second, DM-RS port table. In case the UE only supports a single multi-TRP Ultra-Reliable Low-Latency Communication (URLLC) scheme, more rows of the DM-RS port table can be utilized to indicate that scheme, implying that more combinations of antenna ports and number of layers can be indicated. Alternatively, which DM-RS table to use may be higher layer configured to the UE so that, e.g., even if the UE supports both single-RV FDM and slot-based TDM it can be allocated a DM-RS port indication table which only comprises entries indicating single-RV FDM and not comprising entries indicating slot-based TDM. This higher layer configuration may in turn be contingent on UE's capability signaling such that a UE is not expected to be configured with a DM-RS port indication table indicating a multi-TRP URLLC scheme which the UE does not support according to its capability signaling.

Figures 10A, 10B:
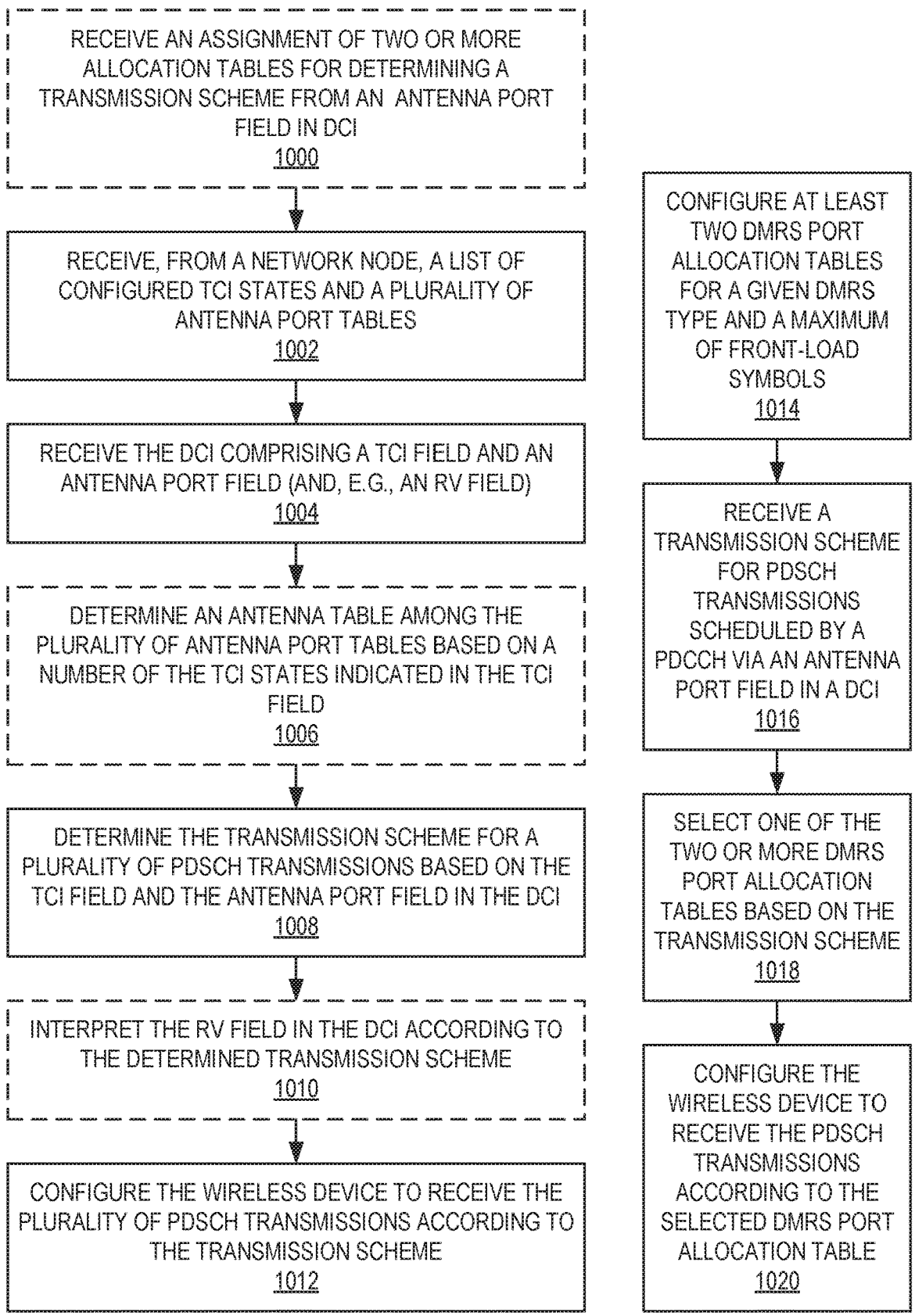
FIG. 10A is a flowchart illustrating a method in accordance with particular embodiments.
FIG. 10B is a flowchart illustrating an alternative embodiment of the method of FIG. 10A.

FIG. 10A is a flowchart illustrating a method in accordance with particular embodiments. This method may be performed by a UE. Optional features are indicated with dashed boxes. The method may optionally begin at step 1000 with receiving an assignment of two or more allocation tables for determining a transmission scheme from an antenna port field in DCI. The method also includes step 1002 with receiving, from a network node, a list of configured TCI states and one or more antenna port tables. The method also includes step 1004 with receiving the DCI comprising a TCI field and an antenna port field (and in some examples an RV field). The method may optionally include step 1006 with determining an antenna table among the plurality of antenna port tables based on a number of the TCI states indicated in the TCI field. In some examples, determining the antenna table comprises selecting a DM-RS port table from the plurality of antenna port tables, based on one or more of: a number of the indicated TCI states in the DCI, a configured DM-RS type, or a maximum number of front-load symbols for the plurality of PDSCH transmissions.

The method also includes step 1008 with determining a transmission scheme for a plurality of PDSCH transmissions based on the TCI field and the antenna port field in the DCI. The method may optionally include step 1010 with interpreting the RV field in the DCI according to the determined transmission scheme. In some examples, interpreting the RV field comprises determining an RV for each of the plurality of PDSCH transmissions based on the RV field in the DCI according to the determined transmission scheme. The method also includes step 1012 with configuring the wireless device to receive the plurality of PDSCH transmissions according to the transmission scheme.

FIG. 10B is a flowchart illustrating an alternative embodiment of the method of FIG. 10A. This method may be performed by a UE. The method begins at step 1014 with configuring at least two DM-RS port allocation tables for a given DM-RS type and a maximum of front-load symbols. The method also includes step 1016 with receiving a transmission scheme for PDSCH transmissions scheduled by a Physical Downlink Control Channel (PDCCH) via an antenna port field in a DCI. The method also includes step 1018 with selecting one of the two or more DM-RS port allocation tables based on the transmission scheme. The method also includes step 1020 with configuring the wireless device to receive the PDSCH transmissions according to the selected DM-RS port allocation table (e.g., based on indicated TCI states and/or RVs).

FIG. 11A is a flowchart illustrating a method in accordance with particular embodiments. This method may be performed by a base station. Optional features are indicated with dashed boxes. The method may optionally begin at step 1100 with assigning two or more allocation tables to the UE for determining the transmission scheme. The method also includes step 1102 with signaling at least two TCI states and at least two RVs in DCI. The method may optionally include step 1104 with assigning an RV of the at least two RVs and a TCI state of the at least two TCI states for each of the plurality of PDSCH transmissions. The method also includes step 1106 with signaling, to the UE, a transmission scheme for a plurality of PDSCH transmissions via an antenna port field in the DCI.

The method may optionally include step 1108 with indicating in the DCI different TCI states associated with the plurality of PDSCH transmissions. The method may optionally include step 1110 with sending the plurality of PDSCH transmissions according to the transmission scheme, the at least two TCI states, and the at least two RVs. For a mini-slot-based TDM scheme with multi-RV, sending the plurality of PDSCH transmissions comprises transmitting a first PDSCH transmission prior to transmitting a second PDSCH transmission. For a multi-RV FDM scheme, sending the plurality of PDSCH transmissions comprises transmitting a first PDSCH transmission on a first frequency domain resource with a starting RB having a smaller index value than a starting RB of a second frequency domain resource allocated for a second PDSCH transmission.

FIG. 11B is a flowchart illustrating an alternative embodiment of the method of FIG. 11A. This method may be performed by a base station. The method begins at step 1112 with configuring at least two DM-RS port allocation tables for a given DM-RS type and a maximum of front-load symbols. The method also includes step 1114 with signaling, to the UE, a first transmission scheme for a first PDSCH scheduled by a PDCCH via a first antenna port field in a DCI.

Figure 12:
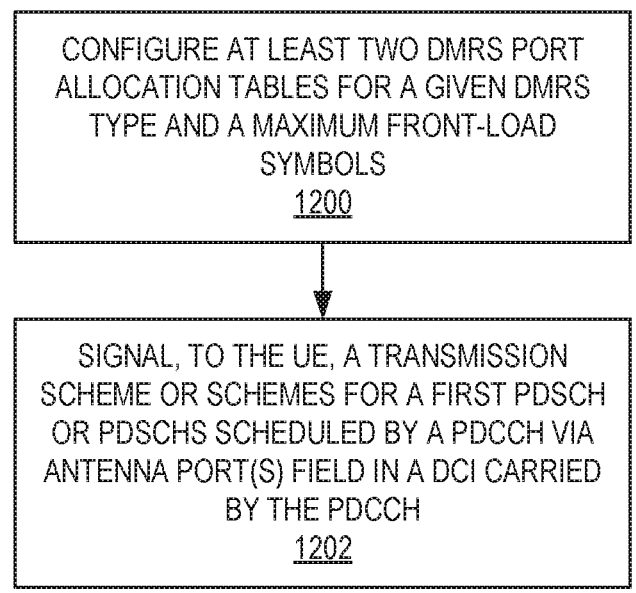
FIG. 12 is a flowchart illustrating a method in accordance with particular embodiments.

FIG. 12 is a flowchart illustrating a method in accordance with particular embodiments. The method may be performed in a wireless network comprising a plurality of TRPs and a UE. The method begins at step 1200 with configuring at least two DM-RS port allocation tables for a given DM-RS type and a maximum front-load symbols. The method also includes step 1202 with signaling, to the UE, a transmission scheme or schemes for a PDSCH or PDSCHs scheduled by a PDCCH via antenna port(s) field in a DCI carried by the PDCCH.

Figure 13:
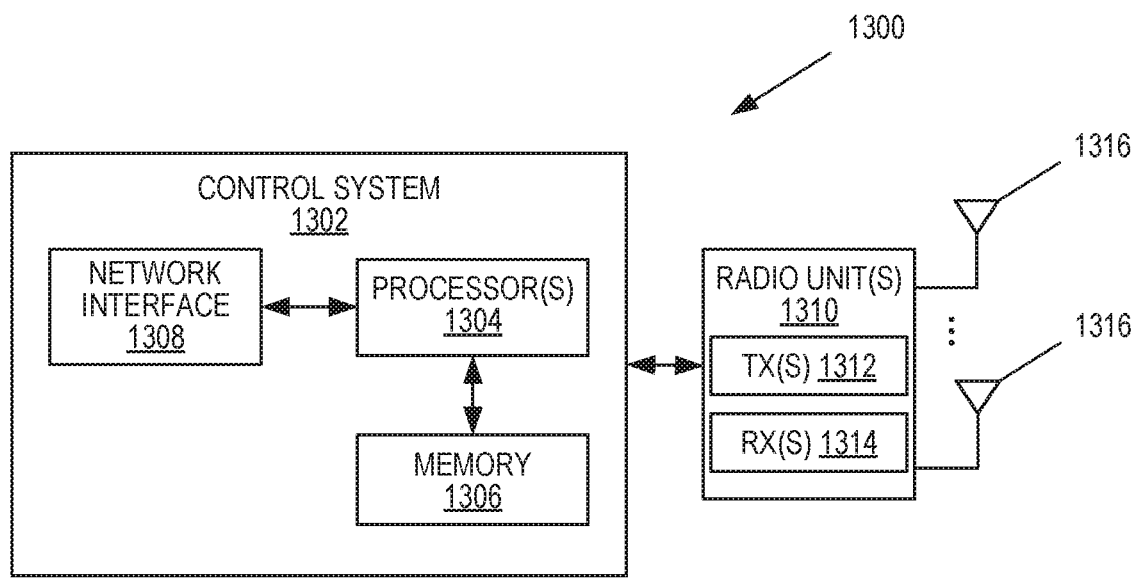
FIG. 13 is a schematic block diagram of a radio access node according to some embodiments of the present disclosure.

FIG. 13 is a schematic block diagram of a radio access node 1300 according to some embodiments of the present disclosure. The radio access node 1300 may be, for example, a base station 902 or 906. As illustrated, the radio access node 1300 includes a control system 1302 that includes one or more processors 1304 (e.g., Central Processing Units (CPUs), Application Specific Integrated Circuits (ASICs), Field Programmable Gate Arrays (FPGAs), and/or the like), memory 1306, and a network interface 1308. The one or more processors 1304 are also referred to herein as processing circuitry. In addition, the radio access node 1300 includes one or more radio units 1310 that each includes one or more transmitters 1312 and one or more receivers 1314 coupled to one or more antennas 1316. The radio units 1310 may be referred to or be part of radio interface circuitry. In some embodiments, the radio unit(s) 1310 is external to the control system 1302 and connected to the control system 1302 via, e.g., a wired connection (e.g., an optical cable). However, in some other embodiments, the radio unit(s) 1310 and potentially the antenna(s) 1316 are integrated together with the control system 1302. The one or more processors 1304 operate to provide one or more functions of a radio access node 1300 as described herein. In some embodiments, the function(s) are implemented in software that is stored, e.g., in the memory 1306 and executed by the one or more processors 1304.

Figure 14:
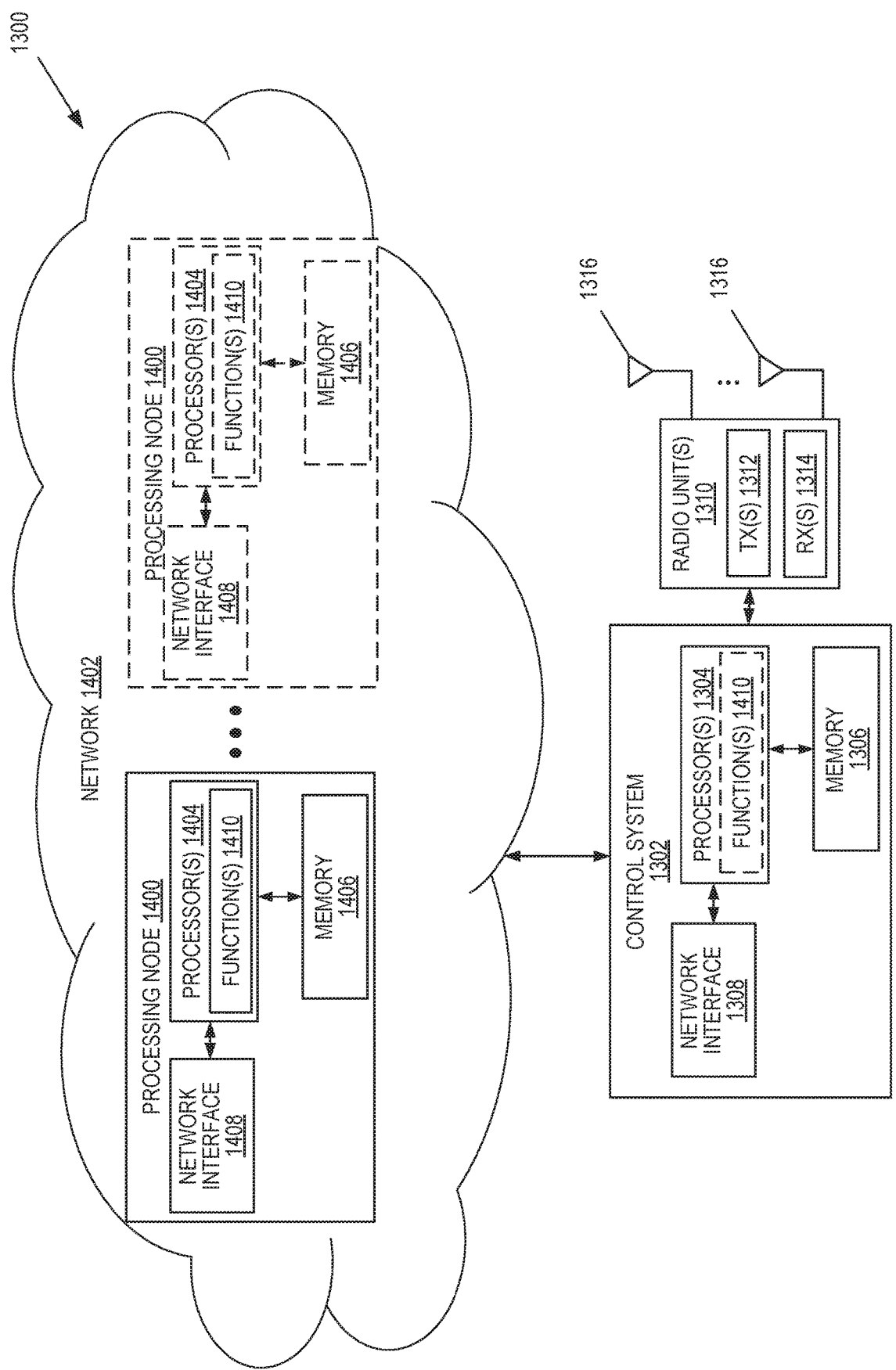
FIG. 14 is a schematic block diagram that illustrates a virtualized embodiment of the radio access node according to some embodiments of the present disclosure.

FIG. 14 is a schematic block diagram that illustrates a virtualized embodiment of the radio access node 1300 according to some embodiments of the present disclosure. This discussion is equally applicable to other types of network nodes. Further, other types of network nodes may have similar virtualized architectures.

As used herein, a "virtualized" radio access node is an implementation of the radio access node 1300 in which at least a portion of the functionality of the radio access node 1300 is implemented as a virtual component(s) (e.g., via a virtual machine(s) executing on a physical processing node(s) in a network(s)). As illustrated, in this example, the radio access node 1300 includes the control system 1302 that includes the one or more processors 1304 (e.g., CPUs, ASICs, FPGAs, and/or the like), the memory 1306, and the network interface 1308 and the one or more radio units 1310 that each includes the one or more transmitters 1312 and the one or more receivers 1314 coupled to the one or more antennas 1316, as described above. The control system 1302 is connected to the radio unit(s) 1310 via, for example, an optical cable or the like. The control system 1302 is connected to one or more processing nodes 1400 coupled to or included as part of a network(s) 1402 via the network interface 1308. Each processing node 1400 includes one or more processors 1404 (e.g., CPUs, ASICs, FPGAs, and/or the like), memory 1406, and a network interface 1408.

In this example, functions 1410 of the radio access node 1300 described herein are implemented at the one or more processing nodes 1400 or distributed across the control system 1302 and the one or more processing nodes 1400 in any desired manner. In some particular embodiments, some or all of the functions 1410 of the radio access node 1300 described herein are implemented as virtual components executed by one or more virtual machines implemented in a virtual environment(s) hosted by the processing node(s) 1400. As will be appreciated by one of ordinary skill in the art, additional signaling or communication between the processing node(s) 1400 and the control system 1302 is used in order to carry out at least some of the desired functions 1410. Notably, in some embodiments, the control system 1302 may not be included, in which case the radio unit(s) 1310 communicate directly with the processing node(s) 1400 via an appropriate network interface(s).

In some embodiments, a computer program including instructions which, when executed by at least one processor, causes the at least one processor to carry out the functionality of radio access node 1300 or a node (e.g., a processing node 1400) implementing one or more of the functions 1410 of the radio access node 1300 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 15:
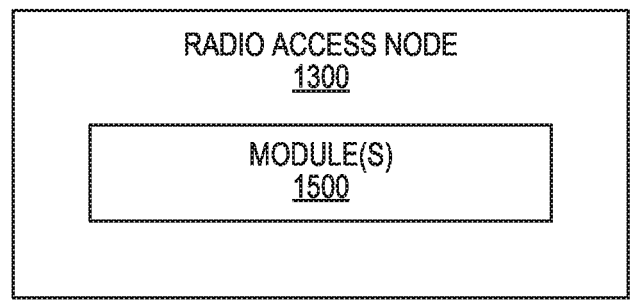
FIG. 15 is a schematic block diagram of the radio access node according to some other embodiments of the present disclosure.

FIG. 15 is a schematic block diagram of the radio access node 1300 according to some other embodiments of the present disclosure. The radio access node 1300 includes one or more modules 1500, each of which is implemented in software. The module(s) 1500 provide the functionality of the radio access node 1300 described herein. This discussion is equally applicable to the processing node 1400 of FIG. 14 where the modules 1500 may be implemented at one of the processing nodes 1400 or distributed across multiple processing nodes 1400 and/or distributed across the processing node(s) 1400 and the control system 1302.

Figure 16:
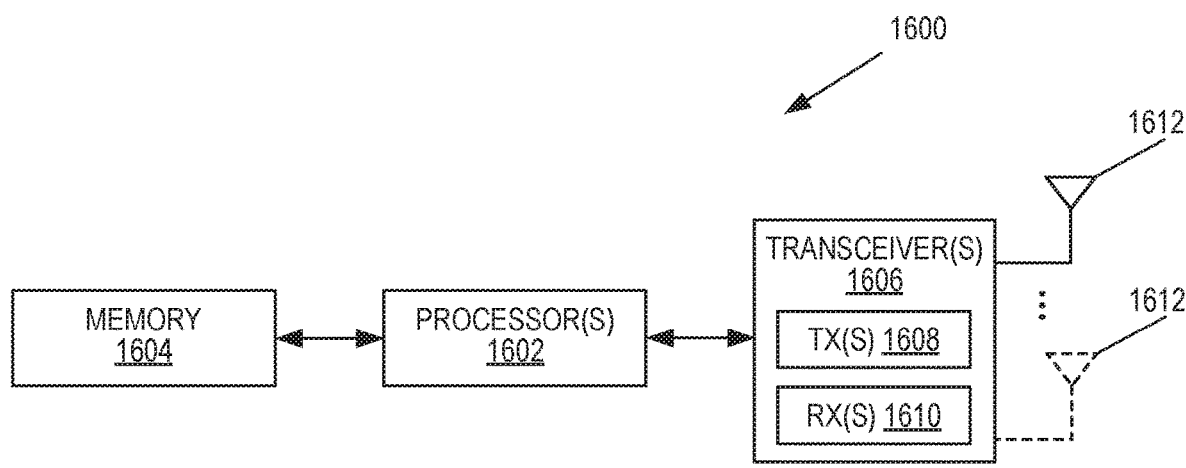
FIG. 16 is a schematic block diagram of a User Equipment (UE) according to some embodiments of the present disclosure.

FIG. 16 is a schematic block diagram of a UE 1600 according to some embodiments of the present disclosure. As illustrated, the UE 1600 includes one or more processors 1602 (e.g., CPUs, ASICs, FPGAs, and/or the like), memory 1604, and one or more transceivers 1606 each including one or more transmitters 1608 and one or more receivers 1610 coupled to one or more antennas 1612. The transceiver(s) 1606 includes radio front-end circuitry connected to the antenna(s) 1612 that is configured to condition signals communicated between the antenna(s) 1612 and the processor(s) 1602, as will be appreciated by on of ordinary skill in the art. The processors 1602 are also referred to herein as processing circuitry. The transceivers 1606 are also referred to herein as radio circuitry. In some embodiments, the functionality of the UE 1600 described above may be fully or partially implemented in software that is, e.g., stored in the memory 1604 and executed by the processor(s) 1602. Note that the UE 1600 may include additional components not illustrated in FIG. 16 such as, e.g., one or more user interface components (e.g., an input/output interface including a display, buttons, a touch screen, a microphone, a speaker(s), and/or the like and/or any other components for allowing input of information into the UE 1600 and/or allowing output of information from the UE 1600), a power supply (e.g., a battery and associated power circuitry), etc.

In some embodiments, a computer program including instructions which, when executed by at least one processor, causes the at least one processor to carry out the functionality of the UE 1600 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 17:
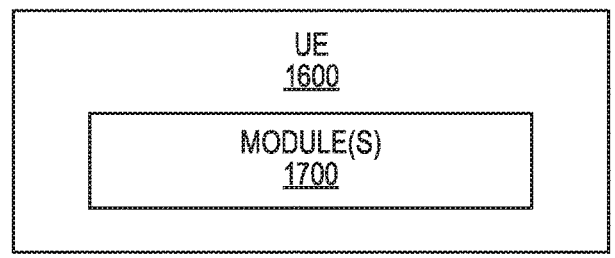
FIG. 17 is a schematic block diagram of the UE according to some other embodiments of the present disclosure.

FIG. 17 is a schematic block diagram of the UE 1600 according to some other embodiments of the present disclosure. The UE 1600 includes one or more modules 1700, each of which is implemented in software. The module(s) 1700 provide the functionality of the UE 1600 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Group A Embodiments

Embodiment 1: A method performed by a wireless device for setting a transmission scheme, the method comprising one or more of: configuring at least two DM-RS port allocation tables for a given DM-RS type and a maximum of front-load symbols; receiving a first transmission scheme for a first PDSCH scheduled by a PDCCH via a first antenna port field in a DCI; selecting one of the at least two DM-RS port allocation tables based on the first transmission scheme; and configuring the wireless device to receive the first PDSCH according to the selected DM-RS port allocation table.

Embodiment 2: The method of embodiment 1, further comprising receiving a second transmission scheme for a second PDSCH scheduled by the PDCCH via a second antenna port field in the DCI.

Embodiment 3: The method of any of embodiments 1 to 2, further comprising receiving a plurality of TCI states in a TCI field of the DCI; wherein each TCI state is associated with a TRP.

Embodiment 4: The method of any of embodiments 1 to 3, wherein the first transmission scheme can be one or more of: a SDM scheme; a first FDM scheme with a single RV; a second FDM scheme with multiple RVs; a mini-slot based TDM scheme; or a slot based TDM scheme.

Embodiment 5: The method of any of embodiments 1 to 3, wherein the first transmission scheme can be one or more of: a combination of SDM and single-RV-based FDM; a combination of single-RV-based FDM and slot-based TDM; a combination of single-RV-based FDM and mini-slot-based TDM; a combination of SDM and slot-based TDM; or a combination of SDM and mini-slot-based TDM.

Embodiment 6: The method of any of the previous embodiments, further comprising one or more of: providing user data; and forwarding the user data to a host computer via a transmission to a base station.

Group B Embodiments

Embodiment 7: A method performed by a base station for signaling a transmission scheme in a wireless network comprising a plurality of TRPs and a UE, the method comprising one or more of: configuring at least two DM-RS port allocation tables for a given DM-RS type and a maximum of front-load symbols; and signaling, to the UE, a first transmission scheme for a first PDSCH scheduled by a PDCCH via a first antenna port field in a DCI.

Embodiment 8: The method of embodiment 7, further comprising signaling, to the UE, a second transmission scheme for a second PDSCH scheduled by the PDCCH via a second antenna port field in the DCI.

Embodiment 9: The method of any of embodiments 7 to 8, wherein one of the at least two DM-RS port allocation tables is an existing table and the other is a new table.

Embodiment 10: The method of embodiment 9, wherein each row of the new table contains a DM-RS port allocation and a transmission scheme or schemes.

Embodiment 11: The method of any of embodiments 9 to 10, wherein the first transmission scheme is determined by one or more of: identifying a row in the new table using an antenna port field; and identifying one or more transmission schemes contained in the row.

Embodiment 12: The method of any of embodiments 9 to 11, wherein the new table or entries of the new table depends on the UE's capability in supporting one of more of the schemes.

Embodiment 13: The method of any of embodiments 9 to 12, wherein the new table is signaled to the UE through higher layer signaling.

Embodiment 14: The method of any of embodiments 7 to 13, wherein: the signaling further comprises signaling a plurality of TCI states in a TCI field of the DCI; and each TCI state is associated with a TRP.

Embodiment 15: The method of any of embodiments 7 to 14, wherein the first transmission scheme can be one or more of: a SDM scheme; a first FDM scheme with a single RV; a second FDM scheme with multiple RVs; a mini-slot based TDM scheme; or a slot based TDM scheme.

Embodiment 16: The method of any of embodiments 7 to 14, wherein the first transmission scheme can be one or more of: a combination of SDM and single-RV-based FDM; a combination of single-RV-based FDM and slot-based TDM; a combination of single-RV-based FDM and mini-slot-based TDM; a combination of SDM and slot-based TDM; or a combination of SDM and mini-slot-based TDM.

Embodiment 17: The method of any of the previous embodiments, further comprising one or more of: obtaining user data; and forwarding the user data to a host computer or a wireless device.

Embodiment 18: A method of signaling transmission scheme(s) in a wireless network comprising a plurality of TRPs and a UE, the method comprising one or more of: configuring at least two DM-RS port allocation tables for a given DM-RS type and a maximum front-load symbols; and signaling, to the UE, a transmission scheme or schemes for a PDSCH or PDSCHs scheduled by a PDCCH via antenna port(s) field in a DCI carried by the PDCCH.

Embodiment 19: The method of embodiment 18, wherein one of the at least two DM-RS port allocation tables is an existing table and the other one or ones is a new table(s).

Embodiment 20: The method of embodiment 19, wherein each row of the new table contains a DM-RS port allocation and a transmission scheme or schemes.

Embodiment 21: The method of any of embodiments 19 to 20, wherein the transmission scheme or schemes is determined by first identifying a row in the new table using the antenna port(s) field and then a scheme or schemes contained in the row.

Embodiment 22: The method of any of embodiments 19 to 21, wherein the new table(s) or entries of the new table(s) may depend on the UE's capability in supporting one of more of the schemes.

Embodiment 23: The method of any of embodiments 19 to 22, wherein the new table(s) is signaled to the UE through higher layer signaling.

Embodiment 24: The method of any of embodiments 18 to 23, wherein the signaling further comprises signaling a plurality of TCI states in a TCI field of the DCI, wherein each TCI state is associated with a TRP.

Embodiment 25: The method of any of embodiments 18 to 24, wherein the transmission scheme can be one or more of: a SDM scheme; a FDM scheme with a single RV; a FDM scheme with multiple RVs; a mini-slot based TDM scheme; or a slot based TDM scheme.

Embodiment 26: The method of any of embodiments 18 to 25, wherein the transmission schemes can be one or more of, a combination of SDM and single-RV-based FDM; a combination of single-RV-based FDM and slot-based TDM; a combination of single-RV-based FDM and mini-slot-based TDM; a combination of SDM and slot-based TDM; or a combination of SDM and mini-slot-based TDM.

Group C Embodiments

Embodiment 27: A wireless device, the wireless device comprising: processing circuitry configured to perform any of the steps of any of the Group A embodiments; and power supply circuitry configured to supply power to the wireless device.

Embodiment 28: A base station, the base station comprising: processing circuitry configured to perform any of the steps of any of the Group B embodiments; and power supply circuitry configured to supply power to the base station.

Embodiment 29: A UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 30: A communication system including a host computer comprising: processing circuitry configured to provide user data; and a communication interface configured to forward the user data to a cellular network for transmission to a UE; wherein the cellular network comprises a base station having a radio interface and processing circuitry, the base station's processing circuitry configured to perform any of the steps of any of the Group B embodiments.

Embodiment 31: The communication system of the previous embodiment further including the base station.

Embodiment 32: The communication system of the previous 2 embodiments, further including the UE, wherein the UE is configured to communicate with the base station.

Embodiment 33: The communication system of the previous 3 embodiments, wherein: the processing circuitry of the host computer is configured to execute a host application, thereby providing the user data; and the UE comprises processing circuitry configured to execute a client application associated with the host application.

Embodiment 34: A method implemented in a communication system including a host computer, a base station, and a UE, the method comprising: at the host computer, providing user data; and at the host computer, initiating a transmission carrying the user data to the UE via a cellular network comprising the base station, wherein the base station performs any of the steps of any of the Group B embodiments.

Embodiment 35: The method of the previous embodiment, further comprising, at the base station, transmitting the user data.

Embodiment 36: The method of the previous 2 embodiments, wherein the user data is provided at the host computer by executing a host application, the method further comprising, at the UE, executing a client application associated with the host application.

Embodiment 37: A UE configured to communicate with a base station, the UE comprising a radio interface and processing circuitry configured to perform the method of the previous 3 embodiments.

Embodiment 38: A communication system including a host computer comprising: processing circuitry configured to provide user data; and a communication interface configured to forward user data to a cellular network for transmission to a UE; wherein the UE comprises a radio interface and processing circuitry, the UE's components configured to perform any of the steps of any of the Group A embodiments.

Embodiment 39: The communication system of the previous embodiment, wherein the cellular network further includes a base station configured to communicate with the UE.

Embodiment 40: The communication system of the previous 2 embodiments, wherein: the processing circuitry of the host computer is configured to execute a host application, thereby providing the user data; and the UE's processing circuitry is configured to execute a client application associated with the host application.

Embodiment 41: A method implemented in a communication system including a host computer, a base station, and a UE, the method comprising: at the host computer, providing user data; and at the host computer, initiating a transmission carrying the user data to the UE via a cellular network comprising the base station, wherein the UE performs any of the steps of any of the Group A embodiments.

Embodiment 42: The method of the previous embodiment, further comprising at the UE, receiving the user data from the base station.

Embodiment 43: A communication system including a host computer comprising: communication interface configured to receive user data originating from a transmission from a UE to a base station; wherein the UE comprises a radio interface and processing circuitry, the UE's processing circuitry configured to perform any of the steps of any of the Group A embodiments.

Embodiment 44: The communication system of the previous embodiment, further including the UE.

Embodiment 45: The communication system of the previous 2 embodiments, further including the base station, wherein the base station comprises a radio interface configured to communicate with the UE and a communication interface configured to forward to the host computer the user data carried by a transmission from the UE to the base station.

Embodiment 46: The communication system of the previous 3 embodiments, wherein: the processing circuitry of the host computer is configured to execute a host application; and the UE's processing circuitry is configured to execute a client application associated with the host application, thereby providing the user data.

Embodiment 47: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 48: A method implemented in a communication system including a host computer, a base station, and a UE, the method comprising: at the host computer, receiving user data transmitted to the base station from the UE, wherein the UE performs any of the steps of any of the Group A embodiments.

Embodiment 49: The method of the previous embodiment, further comprising, at the UE, providing the user data to the base station.

Embodiment 50: The method of the previous 2 embodiments, further comprising: at the UE, executing a client application, thereby providing the user data to be transmitted; and at the host computer, executing a host application associated with the client application.

Embodiment 51: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 52: A communication system including a host computer comprising a communication interface configured to receive user data originating from a transmission from a UE to a base station, wherein the base station comprises a radio interface and processing circuitry, the base station's processing circuitry configured to perform any of the steps of any of the Group B embodiments.

Embodiment 53: The communication system of the previous embodiment further including the base station.

Embodiment 54: The communication system of the previous 2 embodiments, further including the UE, wherein the UE is configured to communicate with the base station.

Embodiment 55: The communication system of the previous 3 embodiments, wherein: the processing circuitry of the host computer is configured to execute a host application; and the UE is configured to execute a client application associated with the host application, thereby providing the user data to be received by the host computer.

Embodiment 56: A method implemented in a communication system including a host computer, a base station, and a UE, the method comprising: at the host computer, receiving, from the base station, user data originating from a transmission which the base station has received from the UE, wherein the UE performs any of the steps of any of the Group A embodiments.

Embodiment 57: The method of the previous embodiment, further comprising at the base station, receiving the user data from the UE.

Embodiment 58: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
ASIC Application Specific Integrated Circuit
CDD Cyclic Delay Diversity
CDM Code Division Multiplexing
CP-OFDM Cyclic Prefix Orthogonal Frequency Division Multiplexing
CPU Central Processing Unit
CSI-RS Channel State Information Reference Signal CW Codeword
DCI Downlink Control Information
DFT-S-OFDM Discrete Fourier Transform Spread Orthogonal Frequency Division Multiplexing
DL Downlink
DM-RS Demodulation Reference Signal
DSP Digital Signal Processor
eNB Enhanced or Evolved Node B
FDM Frequency Domain Multiplexing
FPGA Field Programmable Gate Array
FR1 Frequency Range 1
FR2 Frequency Range 2
gNB New Radio Base Station
LTE Long Term Evolution
MME Mobility Management Entity
MTC Machine Type Communication
NF Network Function
NR New Radio
OCC Orthogonal Cover Code
OFDM Orthogonal Frequency Division Multiplexing
PDCCH Physical Downlink Control Channel
PDCH Physical Data Channel
PDSCH Physical Downlink Shared Channel
P-GW Packet Data Network Gateway
PUSCH Physical Uplink Shared Channel
QCL Quasi Co-Located
RAM Random Access Memory
RAN Radio Access Network
RB Resource Block
RE Resource Element
ROM Read Only Memory
RRC Radio Resource Control
RRH Remote Radio Head
RS Reference Signal
RV Redundancy Version
RVI Redundancy Version Indicator
Rx Receive
SCEF Service Capability Exposure Function
SCS Subcarrier Spacing
SDM Spatial Division Multiplexing
SFN Single Frequency Network
TB Transport Block
TCI Transmission Configuration Indicator
TDM Time Domain Multiplexing
TRP Transmission/Reception Point
TS Technical Specification
UE User Equipment
UL Uplink
URLLC Ultra-Reliable Low-Latency Communication Those skilled in the art will recognize improvements and modifications to the embodiments of the present disclosure. All such improvements and modifications are considered within the scope of the concepts disclosed herein.

What is claimed is:

1. A method performed by a wireless device in a wireless network for determining a Physical Downlink Shared Channel, PDSCH, transmission scheme from a plurality of PDSCH transmission schemes, the method comprising:
receiving Downlink Control Information, DCI, comprising a Transmission Configuration Indicator, TCI, field, a redundancy version, RV, field and an antenna port field;
determining a PDSCH transmission scheme for a plurality of PDSCH transmissions based on the TCI field and the antenna port field in the DCI;
determining an RV for each of the plurality of PDSCH transmissions based on the RV field according to the determined PDSCH transmission scheme;
configuring the wireless device to receive the plurality of PDSCH transmissions according to the determined PDSCH transmission scheme; and
receiving, from a network node, a list of configured TCI states, and a plurality of antenna port tables, wherein a Demodulation Reference Signal, DM-RS, port table, is determined from the plurality of antenna port tables, based on a number of TCI states indicated in the DCI, a configured DM-RS type, or a maximum number of front-load symbols for the plurality of PDSCH transmissions;
wherein the antenna port field in the DCI indicates one or more DM-RS ports in one or more Code Division Multiplexing, CDM, groups for the plurality of PDSCH transmissions according to the selected DM-RS port table; and
the method further comprises:
applying the plurality of TCI states, the plurality of RVs, and the one or more DM-RS ports.

2. The method of claim 1, wherein the DCI is received over a Physical Downlink Control Channel, PDCCH, with DCI format 1-1.

3. The method of claim 1, wherein:
the method further comprises determining an RV for each of the plurality of PDSCH transmissions based on the RV field in the DCI according to the determined transmission PDSCH scheme.

4. The method of claim 3, wherein:
the TCI field indicates a plurality of TCI states out of the list of configured TCI states; and
the RV field indicates a plurality of RVs from a set of pre-specific RV values.

5. The method of claim 3, wherein the transmission PDSCH scheme is a mini-slot-based Time Division Multiplexing, TDM, PDSCH repetition scheme in which a PDSCH is repeated in multiple non-overlapping mini-slots within a time slot with each repetition associated to a different RV and a different TCI state.

6. The method of claim 5, wherein:
the different TCI states associated to the PDSCH transmissions are indicated by the TCI field in the DCI;
a first indicated TCI state is associated to a first PDSCH transmission of the plurality of PDSCH transmissions; and
a second indicated TCI state is associated to a second PDSCH transmission of the plurality of PDSCH transmissions.

7. The method of claim 6, wherein the first PDSCH transmission is received prior to the second PDSCH transmission.

8. The method of claim 3, wherein the transmission PDSCH scheme is a Frequency Division Multiplexing, FDM, multi-RV PDSCH repetition scheme in which a PDSCH is repeated in multiple non-overlapping frequency resources in a same time slot with each repetition associated to a different RV and a different TCI state.

9. The method of claim 8, wherein:
the different TCI states associated to the PDSCH transmissions are indicated by the TCI field in the DCI;
a first indicated TCI state is associated to a first PDSCH transmission of the plurality of PDSCH transmissions; and a second indicated TCI state is associated to a second PDSCH transmission of the plurality of PDSCH transmissions.

10. The method of claim 9, wherein the first PDSCH transmission is received on a first frequency domain resource with a starting Resource Block, RB, having a smaller index value than a starting RB of a second frequency domain resource allocated for the second PDSCH transmission.

11. The method of claim 3, wherein determining the RV for each of the plurality of PDSCH transmissions based on the RV field in the DCI comprises determining different RVs according to the following table:

| RV field value in DCI | RVs for the first and second PDSCH transmissions | |
|---|---|---|
| | $1^{st}$ PDSCH transmission associated with 1st TCI state | $2^{nd}$ PDSCH transmission associated with 2nd TCI state |
| 0 | 0 | 2 |
| 1 | 2 | 3 |
| 2 | 3 | 1 |
| 3 | 1 | 0. |

12. The method of claim 1, wherein the PDSCH transmission scheme comprises one or more of:
a Spatial Division Multiplexing, SDM, scheme;
a first Frequency Division Multiplexing, FDM, scheme with a single Redundancy Version, RV;
a second FDM scheme with multiple RVs;
a mini-slot-based Time Division Multiplexing, TDM, scheme; or
a slot-based TDM scheme.

13. The method of claim 1, wherein the PDSCH transmission scheme comprises one or more of:
a combination of Spatial Division Multiplexing, SDM, and single-Redundancy Version, RV, based Frequency Division Multiplexing, FDM;
a combination of single-RV-based FDM and slot-based Time Division Multiplexing, TDM;
a combination of single-RV-based FDM and mini-slot-based TDM;
a combination of SDM and slot-based TDM; or
a combination of SDM and mini-slot-based TDM.

14. The method of claim 1, further comprising receiving an assignment of two or more allocation tables for determining the PDSCH transmission scheme from the antenna port field in the DCI.

15. A method performed by a base station for signaling a Physical Downlink Shared Channel, PDSCH, transmission scheme in a wireless network comprising a User Equipment, UE, and a plurality of Transmission/Reception Points, TRPs, wherein each TRP is associated with a Transmission Configuration Indication, TCI, state, the method comprising:
signaling a Downlink Control Information, DCI, comprising a TCI field, a redundancy version, RV, field and an antenna port field; and
signaling, to the UE, a PDSCH transmission scheme for a plurality of PDSCH transmissions via an antenna port field in the DCI; and
signaling, to the UE, a list of configured TCI states, and a plurality of antenna port tables, wherein a Demodulation Reference Signal, DM-RS, port table, is determined from the plurality of antenna port tables, based on a number of TCI states indicated in the DCI, a configured DM-RS type, or a maximum number of front-load symbols for the plurality of PDSCH transmissions;
wherein the antenna port field in the DCI indicates one or more DM-RS ports in one or more Code Division Multiplexing, CDM, groups for the plurality of PDSCH transmissions according to the selected DM-RS port table; and
the method further comprises:
applying the plurality of TCI states, the plurality of RVs, and the one or more DM-RS ports.

16. A wireless device, comprising:
one or more transmitters;
one or more receivers; and
processing circuitry associated with the one or more transmitters and the one or more receivers, the processing circuitry configured to cause the wireless device to:
receive Downlink Control Information, DCI, comprising a Transmission Configuration Indicator, TCI, field, a redundancy version, RV, field, and an antenna port field;
determine a PDSCH transmission scheme for a plurality of PDSCH transmissions based on the TCI field and the antenna port field in the DCI;
determine an RV for each of the plurality of PDSCH transmissions based on the RV field according to the determined PDSCH transmission scheme; and
configure the wireless device to receive the plurality of PDSCH transmissions according to the determined PDSCH transmission scheme; and
receive, from a network node, a list of configured TCI states, and a plurality of antenna port tables, wherein a Demodulation Reference Signal, DM-RS, port table, is determined from the plurality of antenna port tables, based on a number of TCI states indicated in the DCI, a configured DM-RS type, or a maximum number of front-load symbols for the plurality of PDSCH transmissions;
wherein the antenna port field in the DCI indicates one or more DM-RS ports in one or more Code Division Multiplexing, CDM, groups for the plurality of PDSCH transmissions according to the selected DM-RS port table; and
the processing circuitry is further configured to cause the wireless device to:
apply the plurality of TCI states, the plurality of RVs, and the one or more DM-RS ports.

* * * * *